US010609626B2

United States Patent
Lin et al.

(10) Patent No.: US 10,609,626 B2
(45) Date of Patent: *Mar. 31, 2020

(54) METHODS FOR NETWORK CONFIGURATION SHARING

(71) Applicant: A9.COM. INC., Seattle, WA (US)

(72) Inventors: Austin Lin, San Francisco, CA (US); Paul Nangeroni, San Francisco, CA (US); Nicholas S. Weaver, San Francisco, CA (US); Yahui Jin, San Francisco, CA (US); Nathaniel C. Hardison, San Francisco, CA (US); Amos Schallich, San Francisco, CA (US); Sherman Wang, San Francisco, CA (US)

(73) Assignee: A9.COM. INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,645

(22) Filed: Mar. 15, 2018

(65) Prior Publication Data

US 2018/0206179 A1 Jul. 19, 2018

Related U.S. Application Data

(63) Continuation of application No. 15/716,854, filed on Sep. 27, 2017, now Pat. No. 9,955,406.
(Continued)

(51) Int. Cl.
*H04L 12/28* (2006.01)
*H04W 12/00* (2009.01)
(Continued)

(52) U.S. Cl.
CPC .......... *H04W 48/10* (2013.01); *H04L 12/283* (2013.01); *H04L 12/2807* (2013.01);
(Continued)

(58) Field of Classification Search
CPC ....... H04L 9/085–0897; H04L 12/2801–2898; H04L 12/4641–4695; H04L 41/08–5096; H04L 61/3075–3095; H04L 63/06–126; H04L 63/16–205; H04L 67/12–28; H04L 2463/081; H04W 8/005–30; H04W 12/02–12; H04W 16/18; H04W 16/20; H04W 16/32; H04W 24/02; H04W 24/04; H04W 28/0226; H04W 28/16; H04W 28/18; H04W 28/26; H04W 36/005–385; H04W 40/005–38;
(Continued)

(56) References Cited

U.S. PATENT DOCUMENTS 7,441,043 B1  10/2008  Henry et al.
9,241,367 B2  1/2016  Chen et al.
(Continued)

OTHER PUBLICATIONS

International Search Report and Written Opinion on application No. PCT/US17/53630, dated Nov. 27, 2017.

*Primary Examiner* — Timothy J Weidner
(74) *Attorney, Agent, or Firm* — Lowenstein Sandler LLP

(57) ABSTRACT

A method for network configuration sharing includes receiving a home network configuration associated with a user, identifying an away network, and modifying the configuration of the away network based on the configuration of the home network.

16 Claims, 11 Drawing Sheets

Related U.S. Application Data

(60) Provisional application No. 62/479,196, filed on Mar. 30, 2017, provisional application No. 62/479,399, filed on Mar. 31, 2017, provisional application No. 62/400,419, filed on Sep. 27, 2016.

(51) Int. Cl.

| | | |
|---|---|---|
| *H04W 12/04* | (2009.01) | |
| *H04W 12/06* | (2009.01) | |
| *H04W 24/04* | (2009.01) | |
| *H04W 28/02* | (2009.01) | |
| *H04W 36/00* | (2009.01) | |
| *H04W 36/14* | (2009.01) | |
| *H04W 48/10* | (2009.01) | |
| *H04W 48/12* | (2009.01) | |
| *H04W 80/12* | (2009.01) | |
| *H04W 84/12* | (2009.01) | |
| *H04W 88/08* | (2009.01) | |
| *H04W 88/12* | (2009.01) | |
| *H04W 92/10* | (2009.01) | |
| *H04W 92/12* | (2009.01) | |

(52) U.S. Cl.
CPC ....... *H04L 12/2816* (2013.01); *H04W 12/003* (2019.01); *H04W 12/04* (2013.01); *H04W 12/0602* (2019.01); *H04W 24/04* (2013.01); *H04W 28/0226* (2013.01); *H04W 36/0016* (2013.01); *H04W 36/0038* (2013.01); *H04W 36/14* (2013.01); *H04W 48/12* (2013.01); *H04L 2012/2841* (2013.01); *H04W 80/12* (2013.01); *H04W 84/12* (2013.01); *H04W 88/08* (2013.01); *H04W 88/12* (2013.01); *H04W 92/10* (2013.01); *H04W 92/12* (2013.01)

(58) Field of Classification Search
CPC ... H04W 48/02–20; H04W 60/005–12; H04W 76/02–068; H04W 80/08–12; H04W 84/04–22; H04W 88/005; H04W 88/08–12; H04W 92/12; H04W 92/20; H04W 92/22
See application file for complete search history.

(56) References Cited

U.S. PATENT DOCUMENTS

| | | | |
|---|---|---|---|
| 9,288,692 B2 | 3/2016 | Baker et al. | |
| 9,439,235 B2 | 9/2016 | Hagan | |
| 9,955,406 B2* | 4/2018 | Lin | H04W 48/10 370/311 |
| 10,230,522 B1* | 3/2019 | Roths | H04W 76/10 713/171 |
| 2002/0128925 A1 | 9/2002 | Angeles | |
| 2003/0110240 A1 | 6/2003 | Lockridge et al. | |
| 2003/0115460 A1 | 6/2003 | Arai | |
| 2004/0203748 A1 | 10/2004 | Kappes et al. | |
| 2005/0105496 A1 | 5/2005 | Ambrosino | |
| 2005/0149204 A1 | 7/2005 | Manchester et al. | |
| 2005/0282556 A1 | 12/2005 | Morris | |
| 2006/0159029 A1 | 7/2006 | Samuels et al. | |
| 2006/0247824 A1 | 11/2006 | Walker et al. | |
| 2007/0022185 A1 | 1/2007 | Hamilton et al. | |
| 2007/0206537 A1 | 9/2007 | Cam-Winget et al. | |
| 2008/0075090 A1 | 3/2008 | Farricker et al. | |
| 2008/0151842 A1* | 6/2008 | Tysowski | H04W 4/029 370/338 |
| 2008/0172477 A1 | 7/2008 | Mazur et al. | |
| 2009/0040094 A1 | 2/2009 | Harada et al. | |
| 2009/0119770 A1 | 5/2009 | Soliman et al. | |
| 2010/0008272 A1 | 1/2010 | Messinger et al. | |
| 2010/0074225 A1 | 3/2010 | Johnston | |
| 2010/0097982 A1 | 4/2010 | Eichenberger et al. | |
| 2010/0110948 A1 | 5/2010 | Batta | |
| 2010/0188975 A1 | 7/2010 | Raleigh | |
| 2010/0238862 A1 | 9/2010 | Weir et al. | |
| 2010/0257584 A1 | 10/2010 | Meenan et al. | |
| 2011/0101781 A1 | 5/2011 | Roepke et al. | |
| 2011/0134798 A1 | 6/2011 | Magnuson et al. | |
| 2011/0292206 A1 | 12/2011 | Newton | |
| 2011/0299518 A1 | 12/2011 | Chang | |
| 2012/0023207 A1 | 1/2012 | Gandhewar et al. | |
| 2012/0052384 A1 | 3/2012 | Roh et al. | |
| 2012/0134308 A1 | 5/2012 | Yamada et al. | |
| 2012/0290694 A9 | 11/2012 | Marl et al. | |
| 2012/0309408 A1 | 12/2012 | Marti et al. | |
| 2012/0309410 A1 | 12/2012 | Marti et al. | |
| 2012/0329484 A1 | 12/2012 | Rothschild | |
| 2013/0091254 A1 | 4/2013 | Haddad et al. | |
| 2013/0173797 A1 | 7/2013 | Poirer et al. | |
| 2013/0182712 A1 | 7/2013 | Aguayo et al. | |
| 2013/0219082 A1 | 8/2013 | Mitomi et al. | |
| 2013/0239181 A1 | 9/2013 | Varsavsky et al. | |
| 2013/0301627 A1 | 11/2013 | Chen et al. | |
| 2013/0308618 A1 | 11/2013 | Panneerselvam | |
| 2014/0064126 A1 | 3/2014 | Lim et al. | |
| 2014/0162600 A1 | 6/2014 | Chang et al. | |
| 2014/0283029 A1 | 9/2014 | Chandrasekaran et al. | |
| 2014/0329537 A1 | 11/2014 | Huang | |
| 2014/0334471 A1 | 11/2014 | Chen | |
| 2014/0351392 A1 | 11/2014 | Baker et al. | |
| 2015/0063169 A1 | 3/2015 | Lu | |
| 2015/0089594 A1 | 3/2015 | Subramanian et al. | |
| 2015/0141005 A1 | 5/2015 | Suryavanshi et al. | |
| 2015/0264536 A1 | 9/2015 | Patil et al. | |
| 2016/0037338 A1* | 2/2016 | Venkiteswaran | H04W 12/06 726/4 |
| 2016/0050710 A1 | 2/2016 | Hagan | |
| 2016/0165405 A1 | 6/2016 | Shinozuka et al. | |
| 2016/0165570 A1 | 6/2016 | Kim et al. | |
| 2016/0380820 A1 | 12/2016 | Horvitz et al. | |
| 2017/0026900 A1 | 1/2017 | Goto | |
| 2017/0223536 A1* | 8/2017 | Gupta | H04L 63/0892 726/5 |

\* cited by examiner

METHODS FOR NETWORK CONFIGURATION SHARING

CROSS-REFERENCE TO RELATED APPLICATIONS

This application is a continuation of U.S. application Ser. No. 15/716,854, filed 27 Sep. 2017, which claims the benefit of U.S. Provisional Application Ser. No. 62/400,419, filed on 27 Sep. 2016, U.S. Provisional Application Ser. No. 62/479,196, filed on 30 Mar. 2017, and U.S. Provisional Application Ser. No. 62/479,399, filed on 31 Mar. 2017, each of which is incorporated in its entirety by this reference.

TECHNICAL FIELD

This invention relates generally to the computer networking field, and more specifically to new and useful methods for network configuration sharing in the computer networking field.

BACKGROUND

The modern internet has revolutionized communications by enabling computing devices to transmit large amounts of data quickly over incredibly vast differences. The rate of innovation set by application and web developers is breathtakingly fast, but unfortunately, not all aspects of the internet experience have kept pace. In particular, even as people rely more and more heavily on residential networking solutions to enable internet connectivity for a rapidly increasing collection of electronic devices, the technology underpinning those solutions often provides a woefully inadequate user experience. Users are often faced with difficult connection or configuration tasks, which can need to be repeated for each of many user devices (e.g., laptops, smartphones, smartwatches, etc.), when attempting to use a new network. Thus, there is a need in the computer networking field to create new and useful methods for network configuration sharing.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
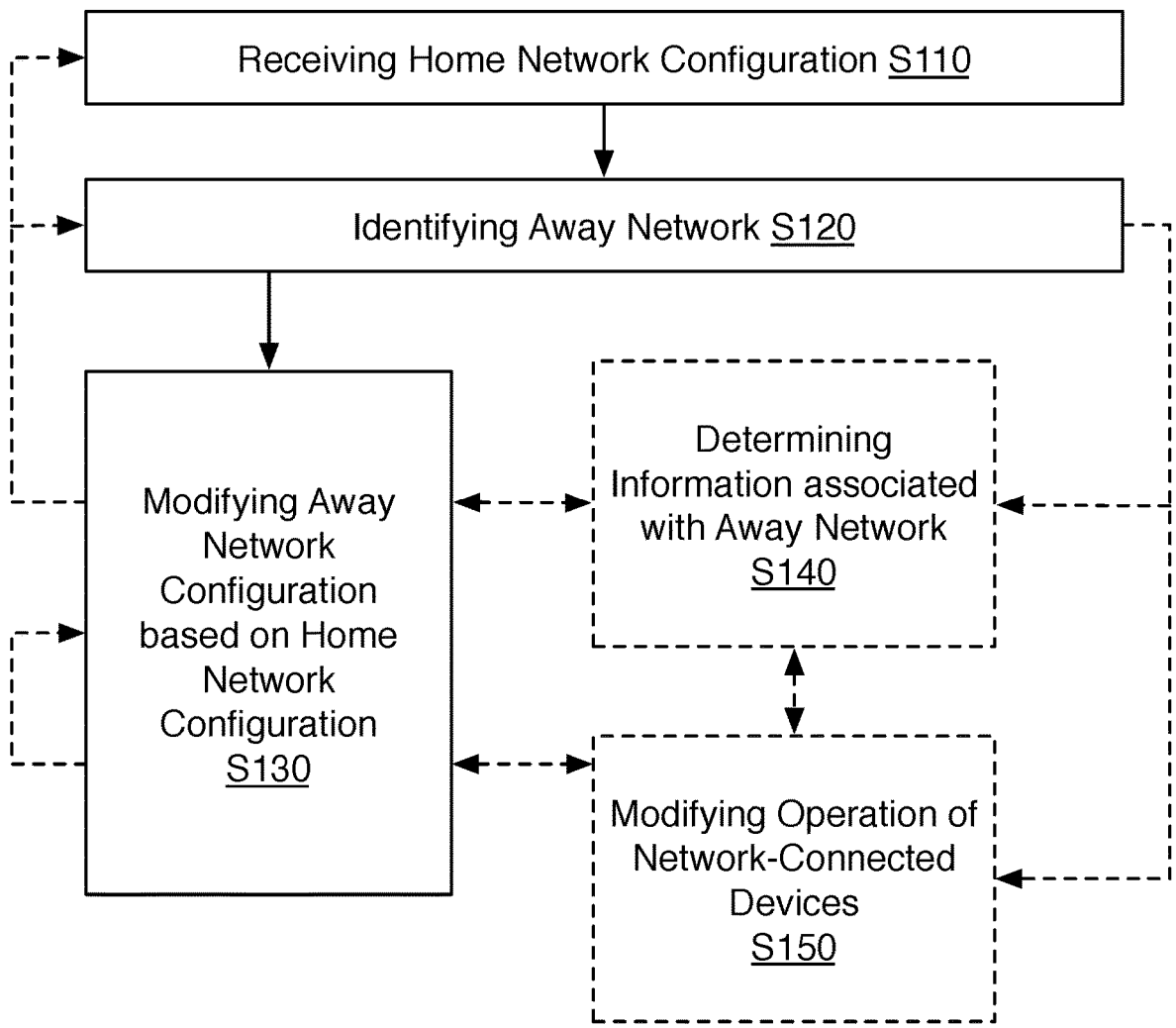
FIG. 1 is a chart representation of a method of a preferred embodiment.

A method 100 for network configuration sharing includes receiving a home network configuration associated with a user S110, identifying an away network S120, and modifying the configuration of the away network based on the configuration of the home network S130 (e.g., as shown in FIGS. 1 and/or 8). The method 100 can additionally or alternatively include determining information associated with the away network S140 and/or modifying operation of network-connected devices S150.

Setting up a network takes time and energy, especially if the network provides anything more than the most basic connectivity. This time and energy must be replicated when users connect their devices to new networks. The method 100 functions to enable the automatic re-configuration of networks based on a preferred network configuration (e.g., the network configuration of a user's home network).

The method can confer several benefits over conventional systems. In variants, the method can reduce or eliminate the time and/or difficulty (e.g., obtaining authentication credentials, such as passwords, from friends, businesses, and/or other entities; entering the authentication credentials into one or more user devices; etc.) associated with establishing access to away networks (e.g., networks at friends' houses, vacation homes, hotels, restaurants, etc.). The method can additionally or alternatively enable access to and/or use of user preferences, such as home automation preferences (e.g., for security, lighting, music, climate, etc.), even when not at home (e.g., when connected to an away network rather than a home network). However, the method 100 can additionally or alternatively confer any other suitable benefits.

Throughout this specification, the term 'home network' will be used to refer to a network associated with a preferred network configuration; a person of ordinary skill in the art will recognize that this network can be any type of network (e.g., a home network, an office network, a commercial network, etc.). Likewise, the term 'away network' will be used to refer to a network for which configuration modification (based on the home network) is desired.

2. System

The method 100 is preferably performed by a remote management platform and a smart router of the away network, but can additionally or alternatively be performed by a smart router of the home network, a user device (e.g., client of a user device), additional smart routers, and/or any other suitable computing device.

The home and away networks of the method 100 preferably each include a smart router configurable by a remote management platform; e.g., as described in U.S. patent application Ser. No. 15/008,251, filed 27 Jan. 2016, the entirety of which is incorporated by this reference. However, any other suitable network or routing system can be used. The home network is preferably a network that the user is accustomed to using, and can be: a network that the user has configured (e.g., through the user's user account; associated with the user account, etc.); a network that the user device has historically connected to; a network for which the user device has stored network configurations; or be any other suitable network. The home network can be any network associated with the user or user device, be a network associated with a "home" label or designation, or be any other suitable network. The away network is preferably a network that the user or user device has not connected to (e.g., does not have stored network configurations for) and/or is not typically authorized to connect to, but can alternatively or additionally be a network associated with a different user account (e.g., different management account), a network that is not associated with the user's user account, a network geographically separated from a home network by a predetermined distance, or be any other suitable network. Each network is preferably associated with different network configurations, geographic regions (e.g., coverage region), and/or any suitable parameter value. However, the networks can alternatively share parameter values.

Figure 2:
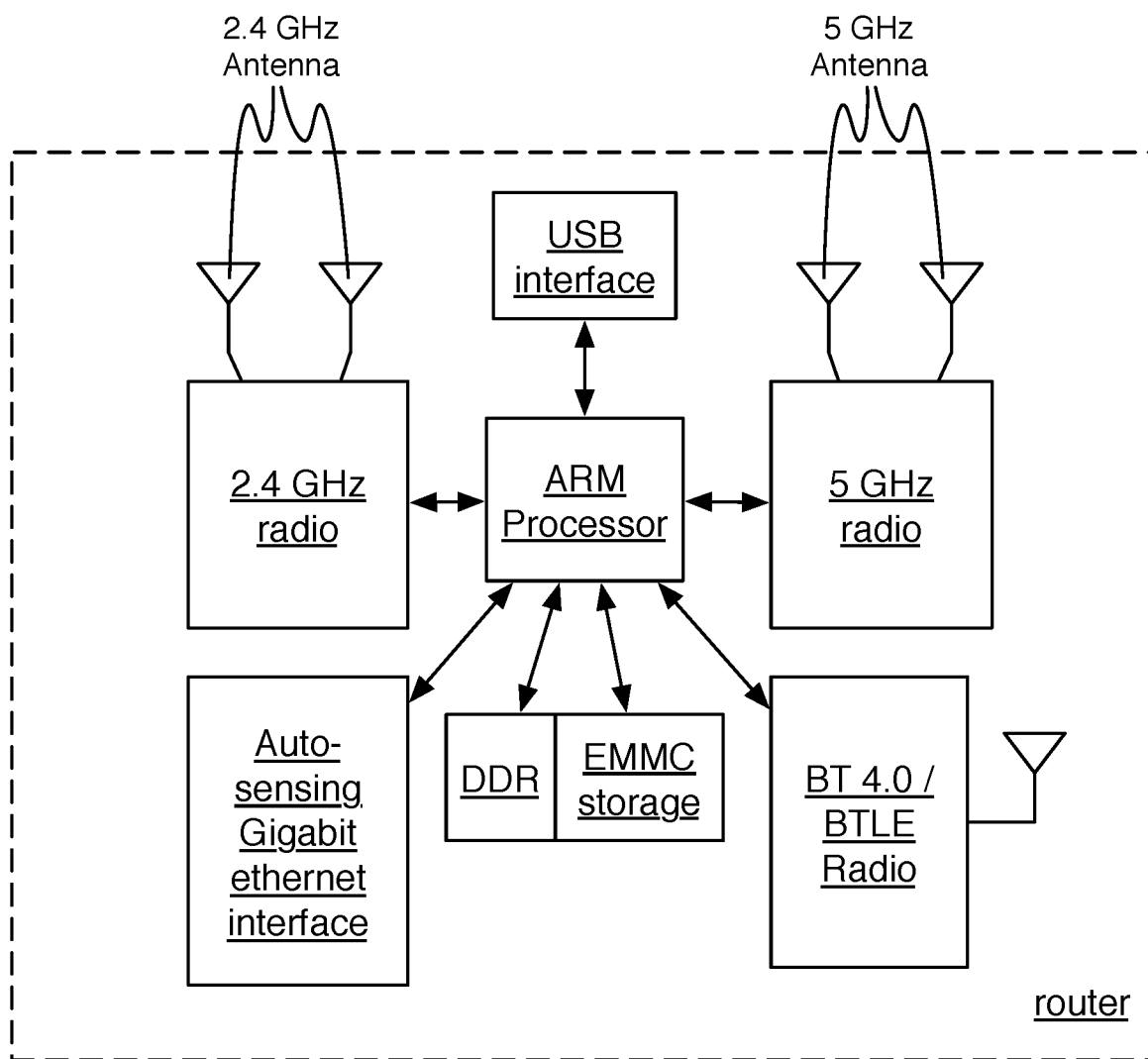
FIG. 2 is a diagram representation of a smart router.

The smart routers of the home and away networks preferably include a Wi-Fi radio and a processor, and more preferably additionally include a Bluetooth radio and an Ethernet interface. The router can additionally or alternatively include any other hardware or software. In one example implementation, as shown in FIG. 2, a smart router includes two Wi-Fi radios: one 5 GHz radio, one 2.4 GHz radio, a Bluetooth radio capable of both Bluetooth 4.0 and BTLE communication, an auto-sensing gigabit Ethernet interface, an ARM processor, DDR RAM, EMMC storage (for router firmware), and a USB interface (e.g., for adding network-accessible storage). In a second example implementation, a smart router includes three Wi-Fi radios: two 5 GHz radios and one 2.4 GHz radio, a Bluetooth radio capable of Bluetooth Smart communication, an 802.15.4 radio (e.g., configured to communicate using one or more 802.15.4 protocols, such as Thread, ZigBee, etc.), an auto-sensing gigabit Ethernet interface, an ARM processor, DDR RAM, and EMMC storage (for router firmware). In a third example implementation, a smart router includes two Wi-Fi radios: one 5 GHz radio and one 2.4 GHz radio, a Bluetooth radio capable of Bluetooth Smart communication, an 802.15.4 radio (e.g., configured to communicate using one or more 802.15.4 protocols, such as Thread, ZigBee, etc.), an ARM processor, DDR RAM, and EMMC storage (for router firmware). Alternatively, the smart routers can be any suitable router, wireless access point, and/or other networking device. However, the smart routers can include any suitable combination of any suitable radios (e.g., short-range radios such as NFC, RF, etc.), processing systems, sensor set, or other components.

The smart routers are preferably configured and/or managed by the remote management platform. For example, smart routers can be configured by altering stored configuration profiles in a remote server (part of the remote management platform), after which the stored configuration profiles are pushed to the smart routers. Remote configurability of the smart routers can function to enable control of both the home and away network configurations by a single entity (e.g., the remote management platform). This centralized control can facilitate automatic configuration sharing between networks. In one example, the remote management platform can access a home network configuration profile (e.g., a configuration profile of a smart router associated with the home network), and can subsequently modify the configuration of the away network based on the home network configuration profile (e.g., by copying configuration elements from the home network configuration profile to an away network configuration profile).

3. Method

3.1 Receiving a Home Network Configuration

Receiving a home network configuration associated with a user S110 functions to determine information about a home network the user is accustomed to using (e.g., a network the user has configured). In particular, S110 preferably functions to determine information related to user authentication and/or connection to the home network.

The home network configuration is preferably received at a remote management platform, but additionally or alternatively can be received at a smart router (e.g., router of the away network), a user device, and/or at any other suitable computing device. The home network configuration is preferably received from the remote management platform (e.g., from a database of the remote management platform), but additionally or alternatively can be received from a smart router (e.g., router of the home network), a user device, and/or at any other suitable computing device.

The home network configuration preferably contains configuration information a user has already applied to his or her home network; e.g., network name and password. Information from the home network configuration can be used to modify the away network configuration (in S130), enabling users to effectively use networks away from home without forcing them to perform tedious configuration.

The home network configuration preferably includes an authentication configuration, which can enable authorized devices to automatically connect to the network while preventing or limiting connection of unauthorized devices. The authentication configuration preferably includes a Wi-Fi SSID and a credential (e.g., pre-shared key (PSK), certificate, public key of a cryptographic key pair, hardware security key such as a U2F device, etc.), and can additionally or alternatively include an authentication mode (e.g., WPA2-PSK, WPA2-802.1X, WEP, no authentication, etc.), a device list (e.g., MAC address whitelist or blacklist), a network identifier, and/or any other suitable authentication configuration information.

The home network configuration can additionally or alternatively include configurations that affect interaction with the network (e.g., by the user, by other authorized users, by network devices, etc.). Such configurations can include a security policy configuration (e.g., a firewall configuration), preferably to maintain network security; content filtering configuration (e.g., website whitelist, protocol blacklist, etc.), preferably to impose parental, workplace, and/or legal controls; quality of service (QoS) configuration, preferably to ensure network performance; a LAN configuration; WAN configuration (e.g., router WAN IP address); NAT configuration (e.g., port forwarding settings); DNS configuration; authentication service configuration; and/or network-connected appliance configuration. The LAN configuration can include a DHCP configuration, VLAN configuration, LAN topology, and/or any other suitable LAN configuration information. The authentication service configuration can be associated with an authentication service such as a password management service (e.g., global password management service, service hosted by a remote server, service enabled by a locally-stored password database such as an encrypted database, etc.). The authentication service configuration can include authentication and/or encryption information (e.g., username, master password, cryptographic key, etc.), data (e.g., encrypted password database), and/or any other suitable information associated with the authentication service. The network-connected appliance configuration can include settings, preferences, historical usage information, and/or any other suitable information associated with network-connected appliances. For example, the network-connected appliance configuration can include lighting configurations (e.g., brightness, color, times of use, etc.), climate control configurations (e.g., HomeControl™, temperature, humidity, etc.), physical security configurations (e.g., access codes such as for alarm systems and/or electronic locks, typical and/or allowed times of property ingress and/or egress, etc.), and/or any other suitable configurations. However, the home network configuration can include any other suitable configuration or configurations. Such configurations can be applied uniformly across all devices (e.g., all devices associated with a user, user account, user group such as a family, etc.; all devices associated with a LAN and/or WAP; etc.), and/or can be applied differently for different devices (e.g., based on device type, associated user, individual device, etc.) or in any other suitable manner. In one example, a content filtering configuration includes a first set of rules associated with adult users of a network (e.g., associated with the adult users' device, device accounts, etc.) and a second set of rules (e.g., less permissive rules, such as rules including more strict website and/or protocol blocking) associated juvenile users of the network (e.g., children of the adult users).

The home network configuration is preferably associated with a user (e.g., through a user identifier). The user identifier can be a username, an authentication credential, a device ID (e.g., of a user device associated with the user), and/or any other suitable identifier. An authentication credential can be a password, a certificate, a one-time password (e.g., TOTP, HOTP, etc.), cryptographic key pair, biometric identifier, and/or any other suitable authentication credential. A device ID can be a MAC address (and/or portion thereof, such as an OUID or other prefix), a device name, a user-agent string, a device-hosted SSID, an identifier associated with a client of the device, and/or any other suitable identifier. A first example of a user identifier is a username associated with a remote router management platform. A second example of a user identifier is a MAC address of a user device. However, the home network configuration can be associated with the user in any other suitable manner.

3.2 Identifying an Away Network

Identifying an away network S120 functions to determine a modifiable network the user is using and/or can use in the future. The away network is preferably identified so that the user's experience using the away network can be improved without forcing the user to manually reconfigure the away network (or request reconfiguration of the away network from a network administrator).

An away network can be any network the user has not configured to his or her preferred criteria; e.g., a network used infrequently by the user, such as a network associated with a temporary residence, acquaintance (e.g., residence, vehicle, or workplace of a friend), shared vehicle, or vendor, but additionally or alternatively can be a network the user is likely to use regularly, such as a network associated with a workplace and/or permanent residence, and/or any other suitable network.

S120 can include identifying away networks in one or more of a number of manners.

Figure 11:
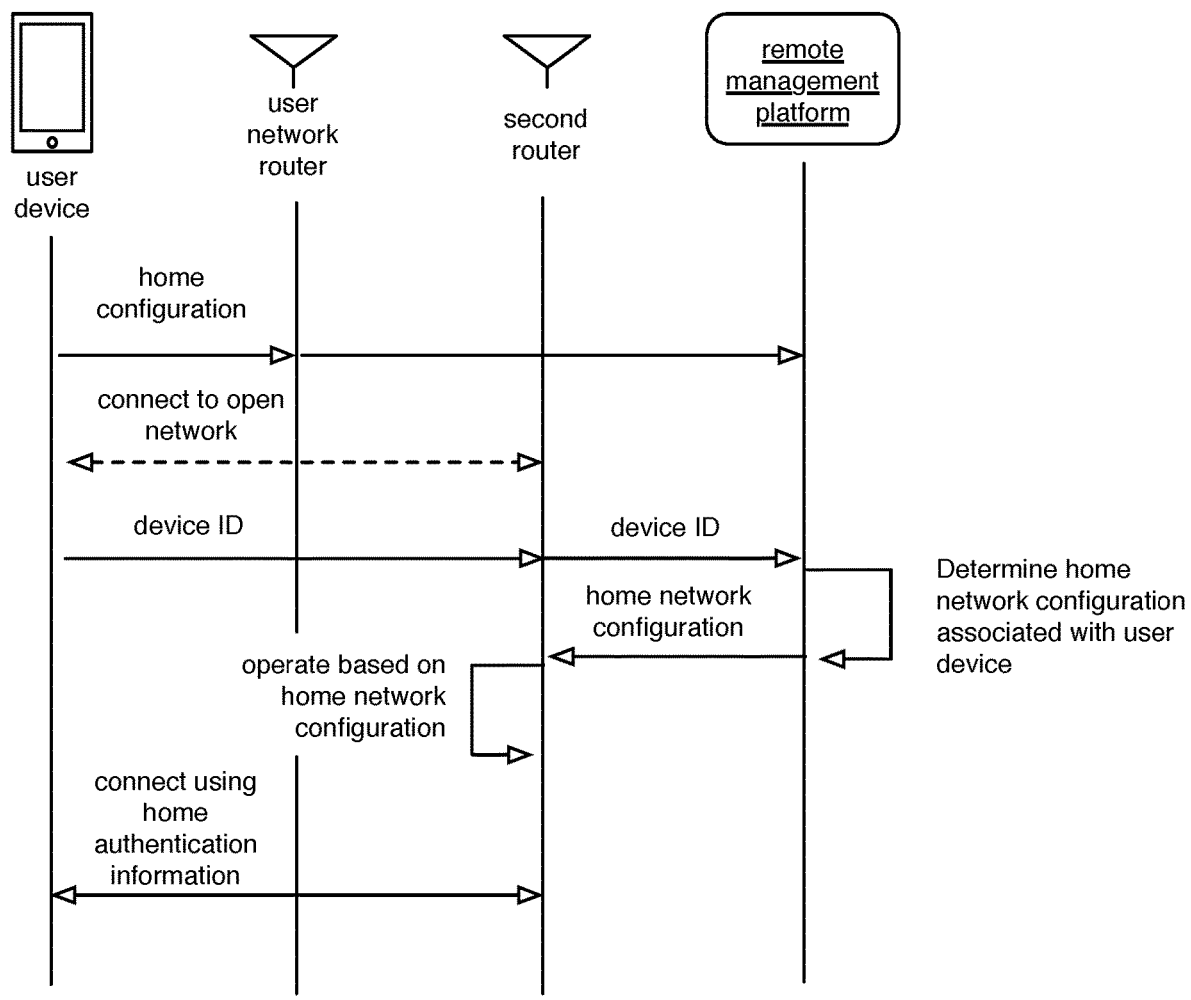
FIG. 11 is a schematic representation of a third specific example of the method.

In a first embodiment, S120 identifies an away network by detecting that a user (having an associated home network configuration) has connected to an away network. For example, S120 can include detecting, at a smart router of the away network, that a user device has connected to the away network, determining an identifier associated with the user device (e.g., MAC address, such as received in a probe request transmitted by the user device; remote management platform ID, such as an ID associated with the user device, a user account, and/or any other suitable user-related entity), and determining that the user device is associated with the user based on the user device identifier. As a second example, S120 can include (e.g., at a user device) detecting that the user device has connected to the away network, determining an identifier of a smart router of the away network (e.g., MAC address, remote management platform ID), and transmitting the identifier of the smart router of the away network to the remote management platform. However, user connection to an away network can be determined in any suitable manner. For example, smart routers can transmit MAC address information to the router management platform to check for associated home network configurations (e.g., as shown in FIG. 11). As a second example, smart routers can locally maintain lists of MAC addresses associated with user devices for which network configuration sharing can be desired.

In a second embodiment, S120 identifies an away network by predicting that a user will connect to an away network. Away network connection predictions can be based on direct indications, computing activity, user locations, and/or any other suitable data (e.g., historical data).

Direct indications can include indications that the user is at, is scheduled to visit, and/or is likely to visit a location associated with the away network, the user has, is scheduled to have, and/or is likely to have access to the away network (e.g., be within range of a wireless signal broadcast by the network), and/or any other suitable indications. Direct indications can include host inputs from a host associated with the away network (e.g., invitation sent to the user; reservation made for the user, preferably in association with the user identifier or account; etc.), user inputs (e.g., request sent to the host), service provider data from a service provider associated with the host and/or user (e.g., authorization for the user to use the network and/or visit a location associated with the network, purchase made at a location associated with the network, etc.), and/or indications from any other suitable source.

Computing activity can include calendar appointments, navigation activity (e.g., location searches, destinations, etc.), communications, web searches, website visitations, advertisement views, connection requests and/or attempts (e.g., wireless network connection requests), and/or any other suitable computing activity.

User locations can be received from a user device (e.g., determined by the user device and/or location service providers; determined based on GPS data, IMU data, Wi-Fi signal data such as SSIDs, Bluetooth signal data, 802.15.4 signal data, near-field communication data, other wireless communication data such as other device identifiers associated with wireless communication protocols, etc.), a network (e.g., away network, a third network; determined based on user device detection by and/or connection to the network), and/or any other suitable source. Additionally or alternatively, user locations can be determined by user recognition (e.g., facial recognition, gait recognition, vocal recognition, etc.; determined based on an image data set, radar data set such as Wi-Fi channel state information, LIDAR data set, audio data set, etc.), user device recognition, vehicle recognition (e.g., license plate recognition, vehicle RFID toll tag, etc.), and/or any other suitable basis.

In a variation of the second embodiment, S120 can include predicting a user connection to the away network by predicting that the user will visit a location associated with the away network. A location associated with the away network is preferably a location within a threshold distance (e.g., a maximum wireless connection distance, such as 35 m, 100 m, or 1 km) of a device connected to the away network (e.g., a smart router of the away network) and/or a location from which the away network can be joined (e.g., coverage area of a smart router or other WAP associated with the away network; potential coverage area of the smart router, such as coverage area after possible wireless radio reconfiguration; geofence associated with the away network; etc.), but additionally or alternatively can be a location associated with a vendor that can provide access to the away network and/or can be any other location associated with the away network in some manner. Predicting that the user will connect to the away network can additionally or alternatively include predicting a time or time window (e.g., including a start time, end time, use duration or time interval, etc.) in which the user is likely to use the away network (e.g., time of connection to the away network, arrival time at a location associated with the network, etc.). The predicted time or time window can be determined based on: a set of predetermined rules, the historic times or duration of away network use for the user or a user population (e.g., mean, median, etc.), calendar information, predicted away network load, reservation information, or otherwise determined. In some variations, predicting that the user will connect to the away network can be based on an assumption that the away network will be modified (e.g., as described below in S130) to allow the user to connect to the away network and/or to facilitate such a connection.

In a first example of the second embodiment, S120 includes predicting the user will visit a location (e.g., associated with an away network) based on information indicative of a planned event associated with a location. The planned event information can include a reservation (e.g., hotel reservation, spa reservation, plane flight, etc.), a calendar agenda item, a service request (e.g., transportation network ride request), and/or any other suitable event or indication thereof. Information indicative of the planned event can be received by the remote management platform and/or any other suitable computing resources (e.g., received from a service provider associated with a reservation; from a user and/or user-related resource, such as a user email account and/or calendar; etc.), and/or can be determined in any other suitable manner.

In a second example, S120 includes predicting the user will visit a location (e.g., associated with an away network) based on location information (e.g., determined by and/or received from a user device associated with the user, one or more smart routers and/or other network devices, etc.). The location information can include current and/or recent location data (e.g., indicative of a user's current behavior), historical location data (e.g., indicative of the user's typical behavior), and/or any other suitable location data. In a specific example, the historical location data is indicative of patterns of user behavior, wherein the patterns and/or user behaviors can be associated with one or more geographic locations (e.g., the user typically uses a first route on weekday mornings to travel to a grocery store, and when the user travels to a specific friend's house, the user typically does so on weekend evenings using a second route). In this specific example, when the recent location data that is received (e.g., at the remote management platform) from a user device (associated with the user) matches a pattern of the historical data (e.g., on a weekday morning, the recent data indicates that the user is traveling along a portion of the first route), the predicted location is set as the historic location associated with the detected pattern or user behavior. In this specific example, based on the location data, S120 includes predicting that the user will visit the location associated with the matched pattern (e.g., the grocery store).

In a third example, S120 includes predicting the user will visit a location (e.g., associated with an away network) based on social network information and/or other social interaction information. For example, if the user is associated with a group of people (e.g., based on social graph data received from a social network), and several members of the group are currently at a location (and/or expected to be at the location at another time, such as based on a prediction determined as described regarding S120 or otherwise), S120 can include predicting that the user will visit the location based on this social network information. This example can additionally or alternatively include predicting user behavior based on the user's communications. For example, if the user sends a message to a friend indicating that they intend to visit a location (e.g., location associated with the friend), this message can be used to predict that the user will visit the location.

In a fourth example, S120 includes both predicting the user will visit a location (e.g., as described above) and detecting (e.g., after making the prediction) that the user is in the location. Based on the prediction, S120 can optionally include altering other prediction and/or detection techniques associated with the user and/or location (e.g., decreasing a threshold for determining that the user is in the location, increasing a threshold for predicting that the user will be in a second location distant from the originally-predicted location, etc.), and/or altering any other suitable user- and/or location-related actions (e.g., in S130, giving preference to the user over other possible guest users of the away network). In a specific example, S120 includes predicting that a first user will be within a region associated with an away network, but does not include predicting that a second user will be within the region (e.g., includes predicting the second user will be outside the region, does not include a prediction related to the second user, etc.). In this specific example, based on location information indicative of both the first and second user being close to the region, S120 can include determining that the first user is likely to use the away network (e.g., and so, in S130, modifying the away network configuration based on the first user's home network configuration), but that the second user is not (e.g., and so not modifying the away network configuration based on the second user's home network configuration).

The away network (and/or devices connected to the away network) can be in and/or near a kiosk (e.g., Wi-Fi access kiosk), a vendor (e.g., coffee shop, bar, restaurant, supermarket, clothing store, etc.), a hospitality service provider (e.g., hotel, short-term rental residence such as a residence reserved through Airbnb™, etc.), a private residence, an office, a shared vehicle (e.g., taxi, ride-sharing vehicle such as a vehicle associated with a transportation network company, bus, train, shuttle, rental car, airplane, ferry, etc.), a private vehicle, and/or any other suitable location.

S120 can be performed using machine learning and/or statistical analysis techniques, and/or using any other suitable techniques. For example, S120 can be performed using one or more of: regression, classification, neural networks (e.g., convolutional neural networks), heuristics, pattern matching, equations (e.g., weighted equations, etc.), selection (e.g., from a library), instance-based methods (e.g., nearest neighbor), regularization methods (e.g., ridge regression), decision trees, Bayesian methods, kernel methods, probability, deterministics, and/or any other suitable method(s).

Identifying an away network S120 is preferably performed at the remote management platform (e.g., based on information stored by the remote management platform; information received from one or more entities such as user devices, smart routers, network administrators, and/or service providers; etc.), but can additionally or alternatively be performed by a smart router, user device, and/or any other suitable computing device. S120 can be performed at a predetermined time, at regular intervals, sporadically, in response to receiving data or detecting events (e.g., associated with the user, host, home network, away network, etc.), and/or at any other suitable time or times. However, the away network can be identified in any suitable manner, by any suitable system, with any suitable timing.

3.3 Modifying the Away Network Configuration

Modifying the configuration of the away network based on the configuration of the home network S130 functions to modify the away network for the user. For example, S130 can enable the user to seamlessly connect to and use the away network in a manner similar or identical to the user's typical connection to and use of the home network, without any manual reconfiguration.

Figure 3:
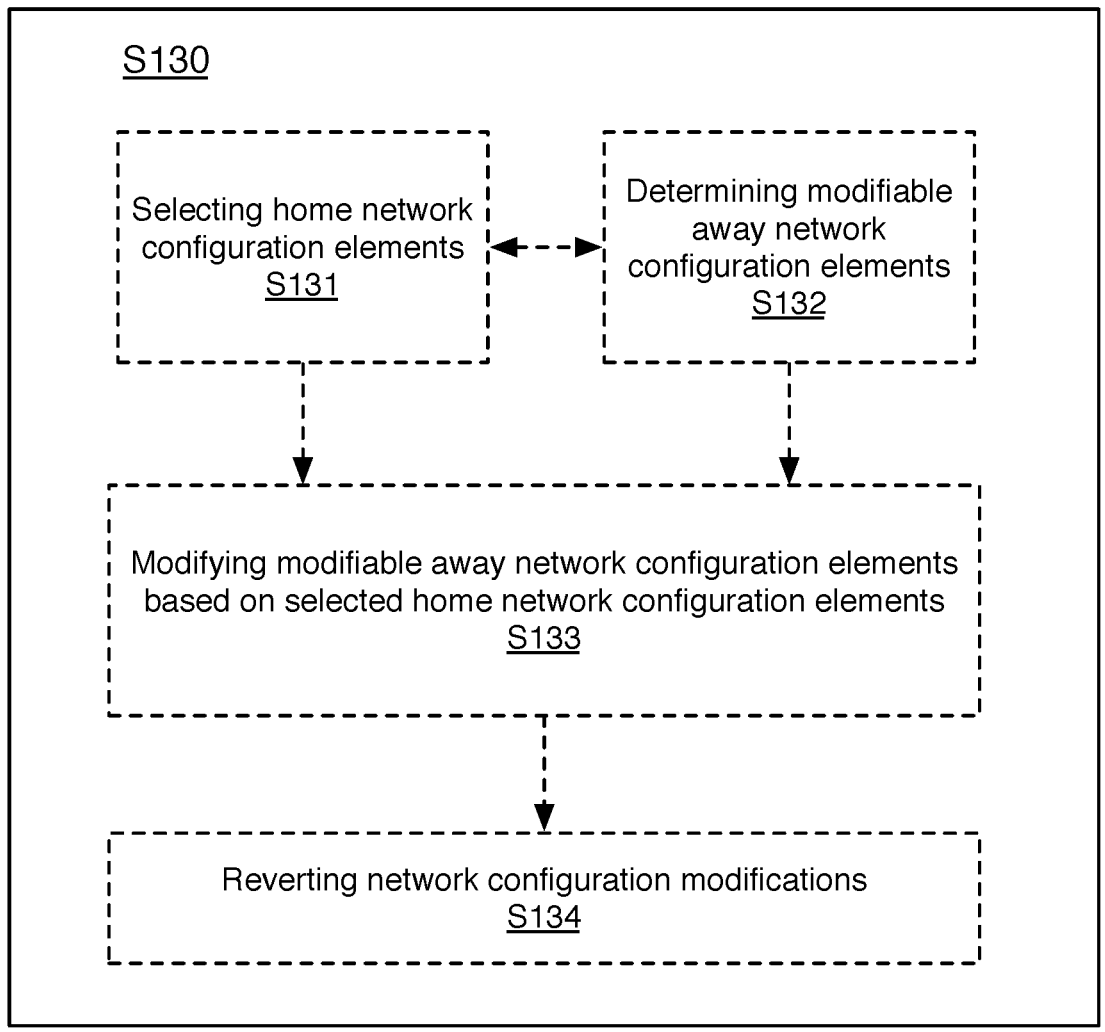
FIG. 3 is a chart representation of a network modification element of a method of a preferred embodiment.

Modifying the configuration of the away network S130 preferably includes selecting desired elements of the home network configuration S131, determining modifiable elements of the away network configuration S132, and modifying the modifiable elements of the away network configuration based on the selected elements of the home network configuration S133, and can additionally or alternatively include reverting network configuration modifications S134, as shown in FIG. 3.

Selecting desired elements of the home network configuration S131 functions to determine a basis for modifying the away network configuration. The selected elements preferably correspond to modifications the user might desire during their use of the away network. Elements are preferably selected from the home network configuration received in S110, but additionally or alternatively can be selected from any suitable home network configuration. The selected elements preferably include the home network authentication configuration, and can additionally or alternatively include aspects of the home network LAN configuration, security policy configuration, NAT configuration, QoS configuration, content filtering configuration, DNS configuration, and/or any other suitable network configuration information.

In a first variation of S131, elements are selected based on a shared set of selection rules. The set of selection rules can be universal (apply to all users and home networks) or shared by a group of users and/or home networks (e.g., grouped based on common features of the users and/or networks). Selection rules can be based on configuration type (e.g., select only authorization configurations and content filtering configurations, select all configurations except WAN configurations, etc.); based on network device type (e.g., portable devices such as phones, smartwatches, tablets, and laptop computers), such as omitting configuration elements not relevant to portable network devices; based on configuration parameter values (e.g., select or omit only firewall rules pertaining to a set of applications or ports, select or omit only DHCP configurations pertaining to a range of IP addresses, etc.); and/or include any other suitable criteria. In a first specific example, a MAC address whitelist is selected, but MAC addresses corresponding to non-portable devices (e.g., desktop computers, home appliances, etc.) are excluded from the whitelist. In a second specific example, all elements of the home network configuration are selected.

In a second variation of S131, elements are selected based on criteria received from a user associated with the home network (e.g., the user, an admin, etc.) Such criteria can include explicit rules and/or any other input to the element selection process. Additionally or alternatively, the criteria can be received from a user associated with the away network, or from any other suitable user.

In a third variation of S131, elements are selected based on user activity (e.g., automatically, according to a rule set, etc.). For example, elements that enable typical user interactions with the home network can be selected, while elements that do not substantially affect the user's home network activity can be omitted. However, desired elements of the home network configuration can be selected in any suitable manner.

Determining modifiable elements of the away network configuration S132 functions to determine potential ways to modify the away network for the user. S132 can include determining a set of possible modifications that can be made to the away network configuration and selecting a set of allowed modifications from the set of possible modifications. The set of allowed modifications preferably include authentication configuration modifications, and can additionally or alternatively include any other suitable modifications.

The set of possible modifications can be determined based on the away network configuration, the smart router capabilities, the remote management platform capabilities, user device capabilities, and/or any other suitable criteria.

The set of allowed modifications is preferably selected based on modification settings associated with the away network. The modification settings can be determined based on security concerns, usability concerns, legal restrictions, and/or any other suitable criteria, and/or can be determined manually. The modification settings can be default settings, can be automatically determined based on away network activity and/or the original away network configuration (e.g., to minimize the impact of modifications on typical away network usage), can be received from an administrator of the away network (away network administrator) and/or any other suitable person, and/or can be determined in any other suitable manner.

In one example, the modification settings include a set of appliance control preferences (e.g., received from an away network administrator), which can specify which network-connected appliances can be controlled (e.g., whose operation can be modified) by host and/or guest devices, which aspects of such devices' operation can be modified (e.g., permit turning devices on and off, disallow security setting modifications, etc.), the manner in which such aspects can be modified (e.g., permit adjustment of parameters only within a predefined range, permit selection only from a predefined set of operation settings, etc.), and/or any other suitable preferences associated with control of network-connected appliances.

Determining the modification settings can additionally include requesting permission (e.g., by the user, from an away network administrator, through the remote management platform) to change the modification settings (e.g., to allow a desired modification) and, in response to receiving permission, changing the modification settings accordingly. Permission can be requested and/or received before performing S133, after performing S133 but before performing S134 (e.g., during the user's use of the away network, wherein the corresponding change in modification settings prompts an additional modification of the away network configuration), and/or at any other suitable time.

S133 includes modifying the modifiable elements of the away network configuration based on the selected elements of the home network configuration.

For example, S133 can include segmenting the away network (e.g., into VLANs) to create a guest network segment segregated from a host network segment. Preferably, host devices (e.g., devices authenticated under a host authentication configuration, devices historically associated with the away network, devices connected to the away network before performing S130, etc.) are associated with the host network segment, and guest devices (e.g., devices authenticated under a guest authentication configuration, devices associated with the user, devices not historically associated with the away network, devices not connected to the away network before performing S130, etc.) are associated with the guest network segment. A first variation of segmenting the away network includes creating the host network segment, whereas in a second variation the host network segment exists before the performance of S130.

Segmenting the away network can additionally include applying configurations to one or more of the network segments (preferably, applying a limitation configuration to the guest network segment). A limitation configuration can include bandwidth and/or data transfer limits (e.g., per-device limits, device group limits, entire network segment limit, etc.), a security policy configuration, NAT configuration, QoS configuration, content filtering configuration, and/or any other suitable limitations. In a first example, a limitation configuration can be applied to the guest network segment such that the guest network segment can use no more than 60% of the total network bandwidth and guest devices cannot communicate on ports associated with undesired activity. In a second example, a limitation configuration can be applied to the guest network segment such that high-priority host network segment traffic takes priority over all guest network segment traffic and guest devices can only visit a set of whitelisted websites. In a third example, an advertising configuration can be applied to the guest network segment such that advertisements can be inserted into websites visited by guest devices. However, any other suitable configurations can be applied to the network segments.

Figure 4:
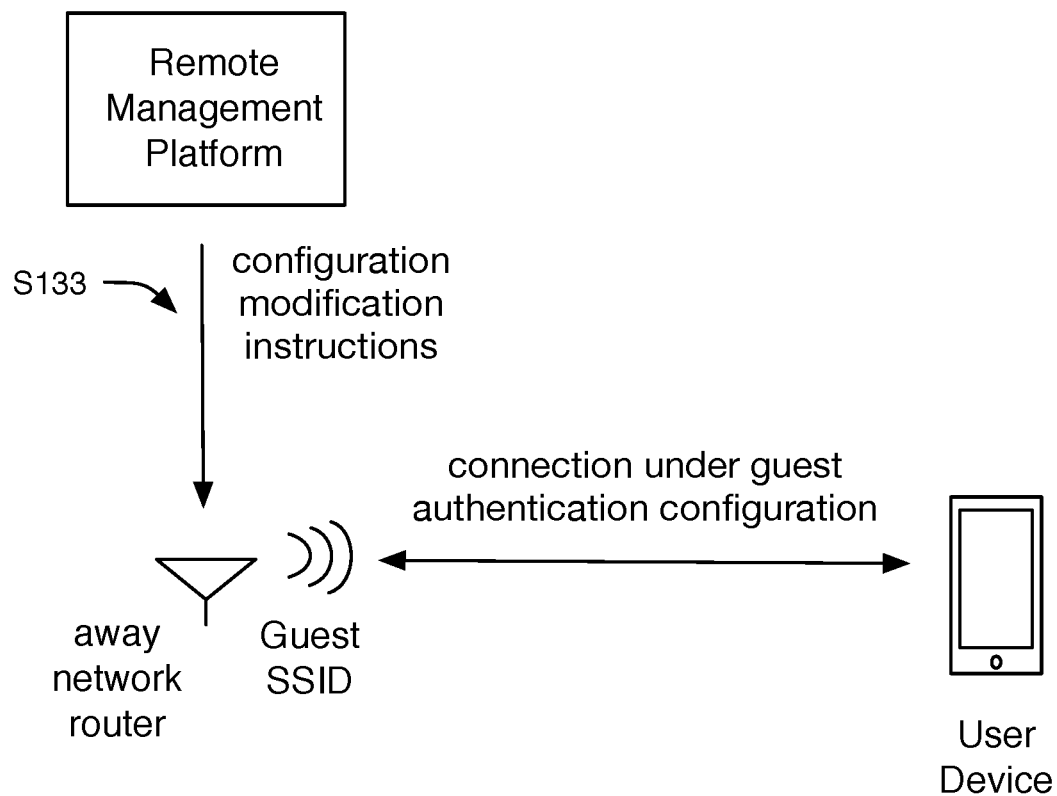
FIG. 4 is a schematic representation of away network modification and subsequent connection under a guest authentication configuration.

S133 can additionally or alternatively include configuring one or more smart routers of the away network to allow connection to the away network under a guest authentication configuration based on the home network authentication configuration (e.g., as shown in FIG. 4).

In some cases, the guest authentication configuration can always be equivalent to the home network authentication configuration. Alternatively, some guest authentication configurations can be precluded (e.g., as determined in S132). For example, specific SSIDs and/or SSIDs matching specific patterns can be precluded (e.g., generic SSIDs such as "home").

Figure 5:
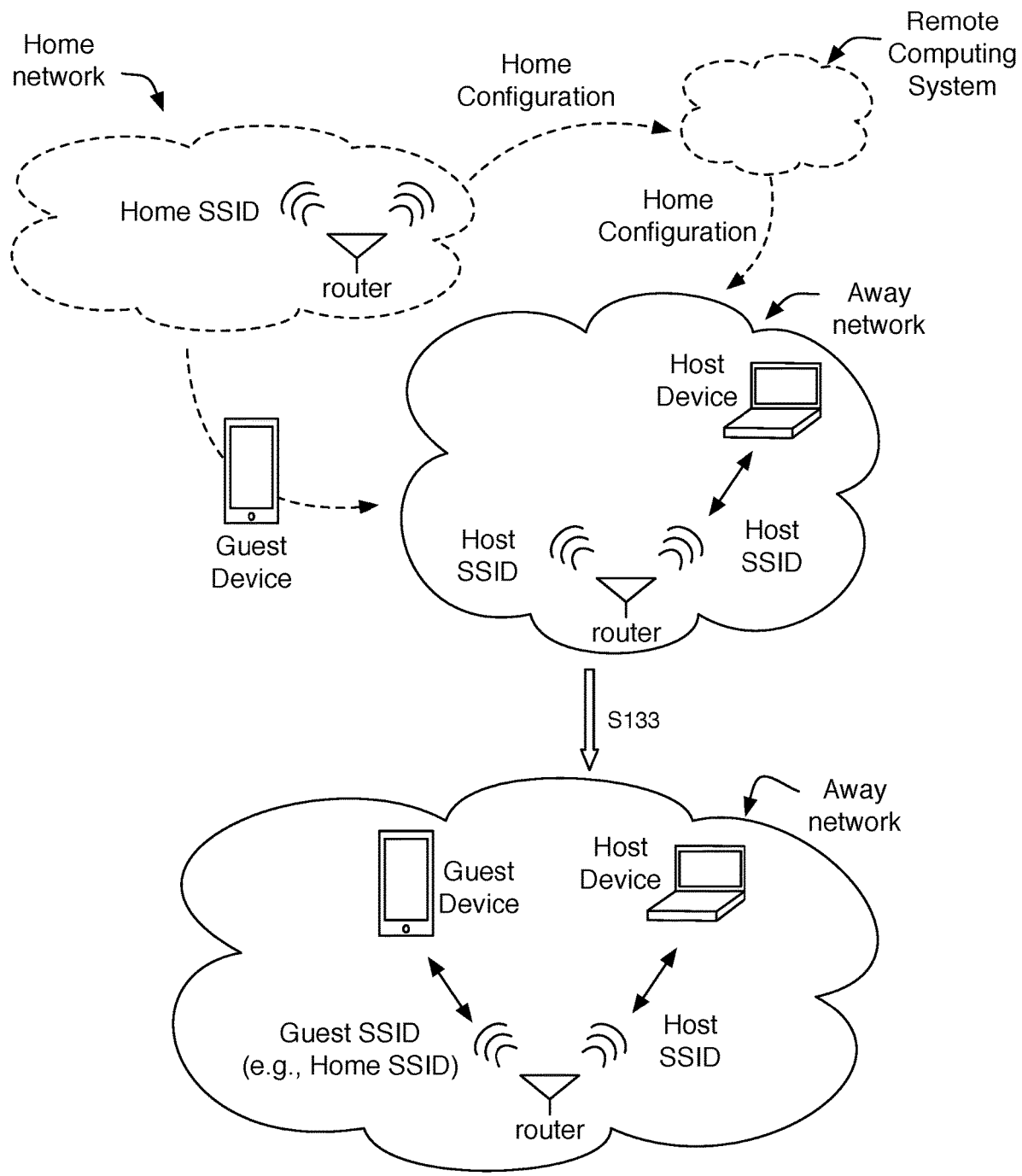
FIG. 5 is a schematic representation of an away network before and after modification.

Preferably, configuring the away network smart router to allow connection under the guest authentication configuration additionally includes continuing to allow connection to the away network under a second authentication configuration (host authentication configuration) based on the original configuration (e.g., configuration used in the away network before performing S130), but alternatively can include precluding connection under the host authentication configuration. Devices can be identified as guest or host devices based on the authentication configuration under which they connect to the away network (e.g., as shown in FIG. 5). In embodiments that include segmenting the away network, devices can be associated with the appropriate network segment based on this identification.

One embodiment of configuring an away network smart router to allow connection to the away network under the guest authentication configuration includes configuring the smart router to accept connections to an SSID matching the SSID of the home network (guest SSID) (e.g., allow devices to associate with the smart router using the guest SSID, allow devices to join an away network service set corresponding to the guest SSID, etc.) when authenticated in a manner accepted for connecting to the home network (e.g., presenting any credentials required for connecting to the home network under an authentication method used in the home network), and preferably additionally includes broadcasting the guest SSID (e.g., transmitting beacon frames including the guest SSID). In one variation of this embodiment, prior to performing S130, the away network smart router broadcasts a host SSID and accepts connections to the host SSID from devices that authenticate using a host credential. This variation further includes (e.g., after performing S133) broadcasting and accepting connections to the guest SSID, preferably while continuing to broadcast and accept connections to the host SSID (e.g., in the same manner as before performing S133). This variation can further include identifying devices that connect to the guest SSID as guest devices, identifying devices that connect to the host SSID as host devices, associating the guest devices with a guest VLAN, and associating the host devices with a host VLAN (e.g., associating by a device identifier such as a MAC address). For example, the remote management platform can transmit to the away network smart router: the guest SSID, a home network PSK associated with the guest SSID, and an instruction to create a guest VLAN.

When multiple SSIDs (e.g., each corresponding to an extended service set (ESS)) are in concurrent use in the away network (e.g., both the host SSID and guest SSID, multiple host and/or guest SSIDs, etc.), the away network routers can handle communication for all the active ESSs using any or all of their radios. For example, an away network router can use a different radio for each ESS (e.g., using its 2.4 GHz radio only for the host SSID and using its 5 GHz radio only for the guest SSID), can use all available radios for each ESS (e.g., separating host and guest service set communication at each radio in time, space, phase, and/or frequency, such as by alternating transmissions and/or using MU-MIMO communication), and/or can allocate radio activity in any other suitable manner.

In some embodiments, the away network includes multiple routers and numerous concurrently-active ESSs (e.g., enough that a single router concurrently in all the active ESSs will experience performance degradation due to the large number of service sets, such as more than 4, 5, 6, 7, 8, 9, 10, 15, or 20 service sets). Such embodiments could arise, for example, if numerous users (e.g., each associated with a different home network) are concurrently in an away network location (e.g., wherein S133 is performed for each such user, resulting in a separate guest SSID for each). In some such embodiments, each router can optionally participate in only a subset of the ESSs (e.g., to avoid or reduce the performance degradation). These participation decisions can be determined based on network communications (e.g., traffic corresponding to each ESS at each router), location information (e.g., relative locations of users and routers), and/or any other suitable information. For example, if a first away network router participates in only minimal activity associated with a first guest SSID and/or all users associated with the first guest SSID are near (e.g., can establish high-quality wireless communication with) other away network routers, the first away network router can (e.g., temporarily, permanently, etc.) stop using the first guest SSID (e.g., disconnect from any user devices using the first guest SSID, stop transmitting beacon frames including the first guest SSID, leave the service set associated with the first guest SSID, etc.). However, an away network with multiple routers can additionally or alternatively accommodate numerous ESSs in any other suitable manner.

Figure 6:
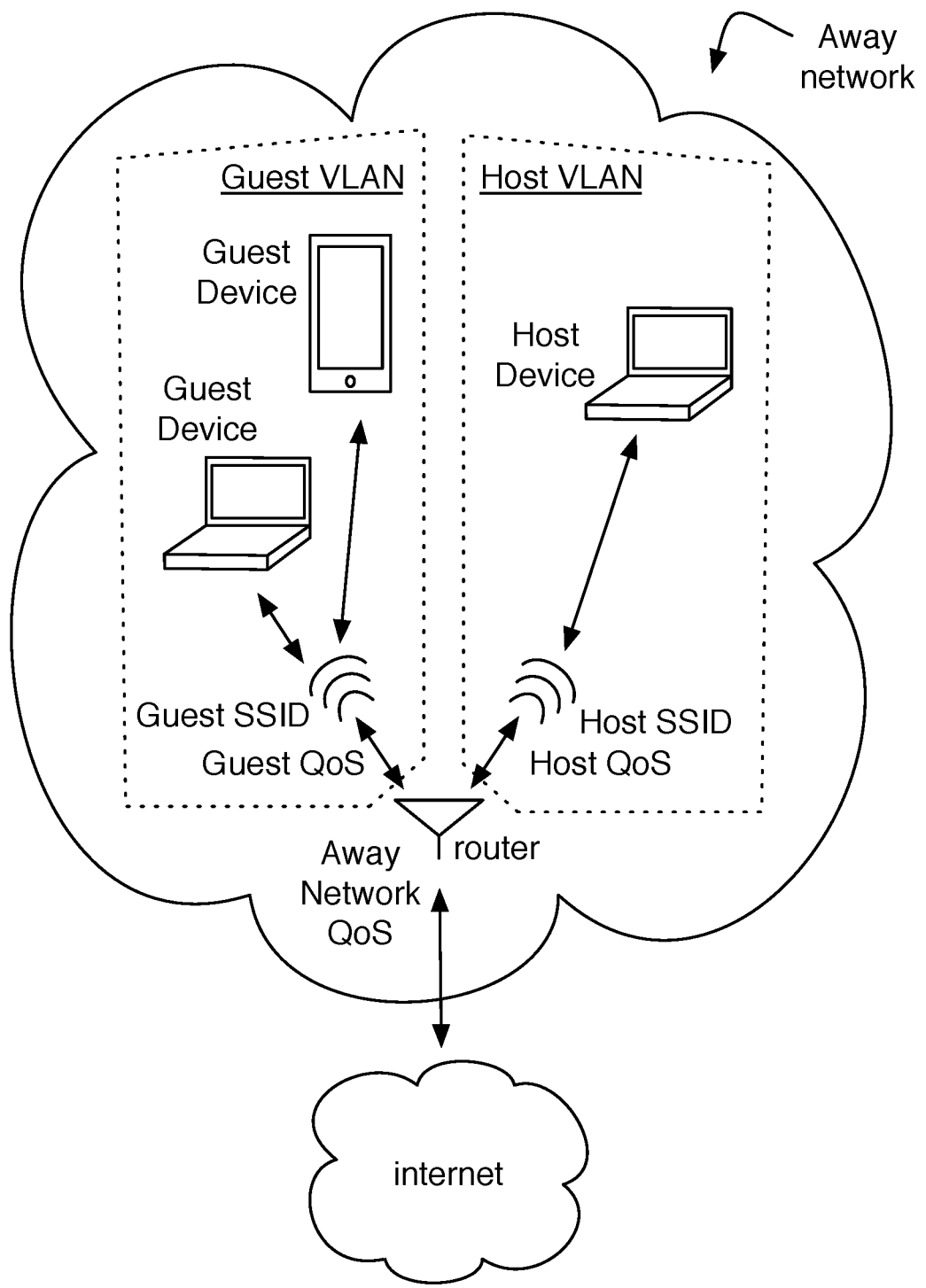
FIG. 6 is a schematic representation of a modified away network.

S133 can additionally or alternatively include configuring the away network smart router (and/or additional smart routers of the away network) to mimic any aspects of the home network. For example, S133 can include configuring the guest VLAN to impose a set of guest QoS rules on guest device traffic identical to the home network QoS rules, block a first port that is blocked on the home network, and block a second port that is open on the home network but blocked on the away network. In this variation, guest device traffic is preferably also subject to the away network QoS rules (example shown in FIG. 6). A second variation includes configuring the guest VLAN to match all elements of the home network configuration selected in S131 for which the required modification is possible. In a first example of this variation, guest VLAN traffic is also subject to an away network limitation configuration (e.g., the guest VLAN can be configured with firewall rules matching the home network firewall rules, but guest VLAN traffic will also be subject to away network firewall rules). In a second example, guest VLAN traffic is not subject to an away network limitation configuration.

Figure 7:
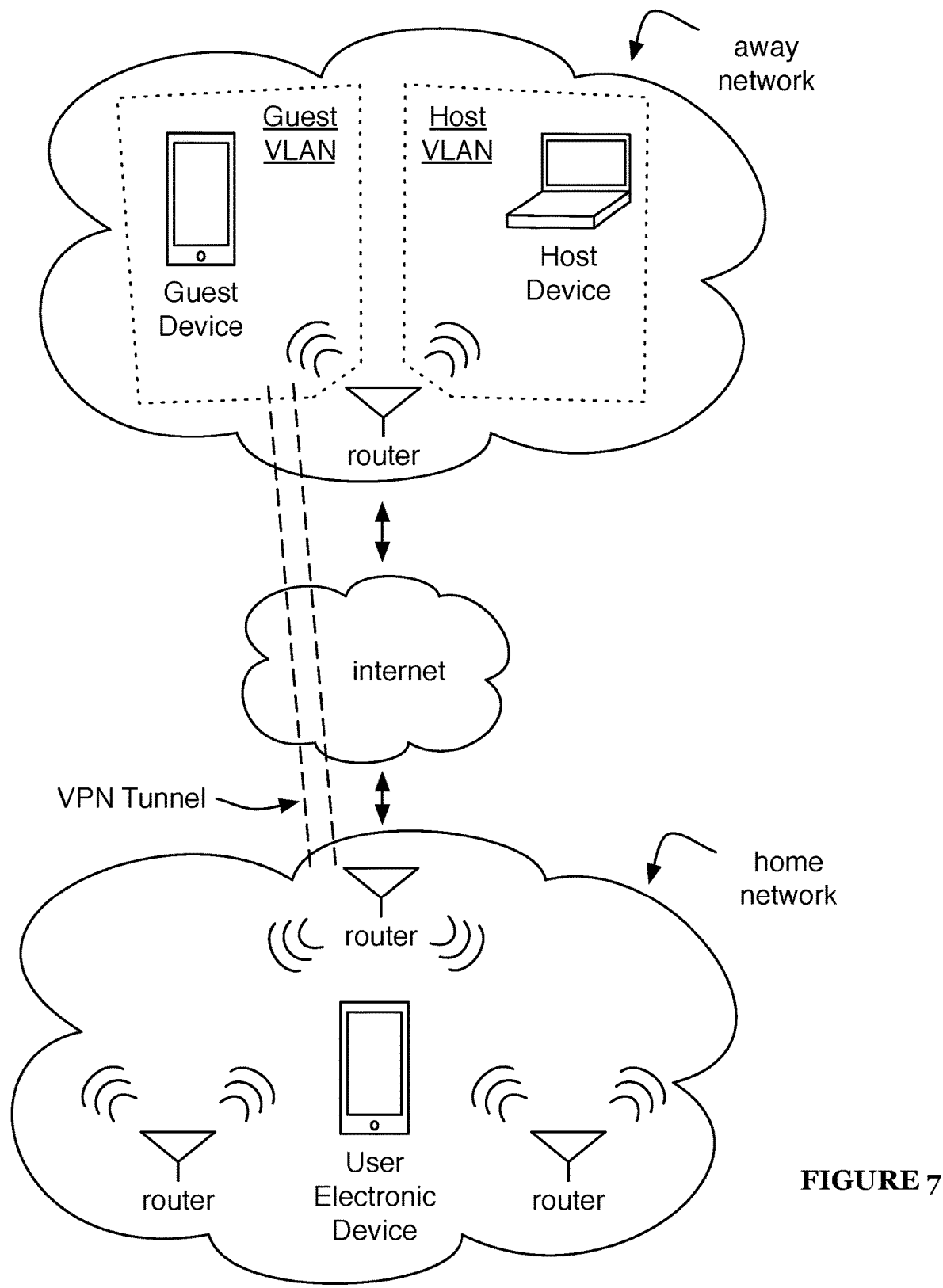
FIG. 7 is a schematic representation of a home network and a modified away network connected by a VPN tunnel.
Figure 8:
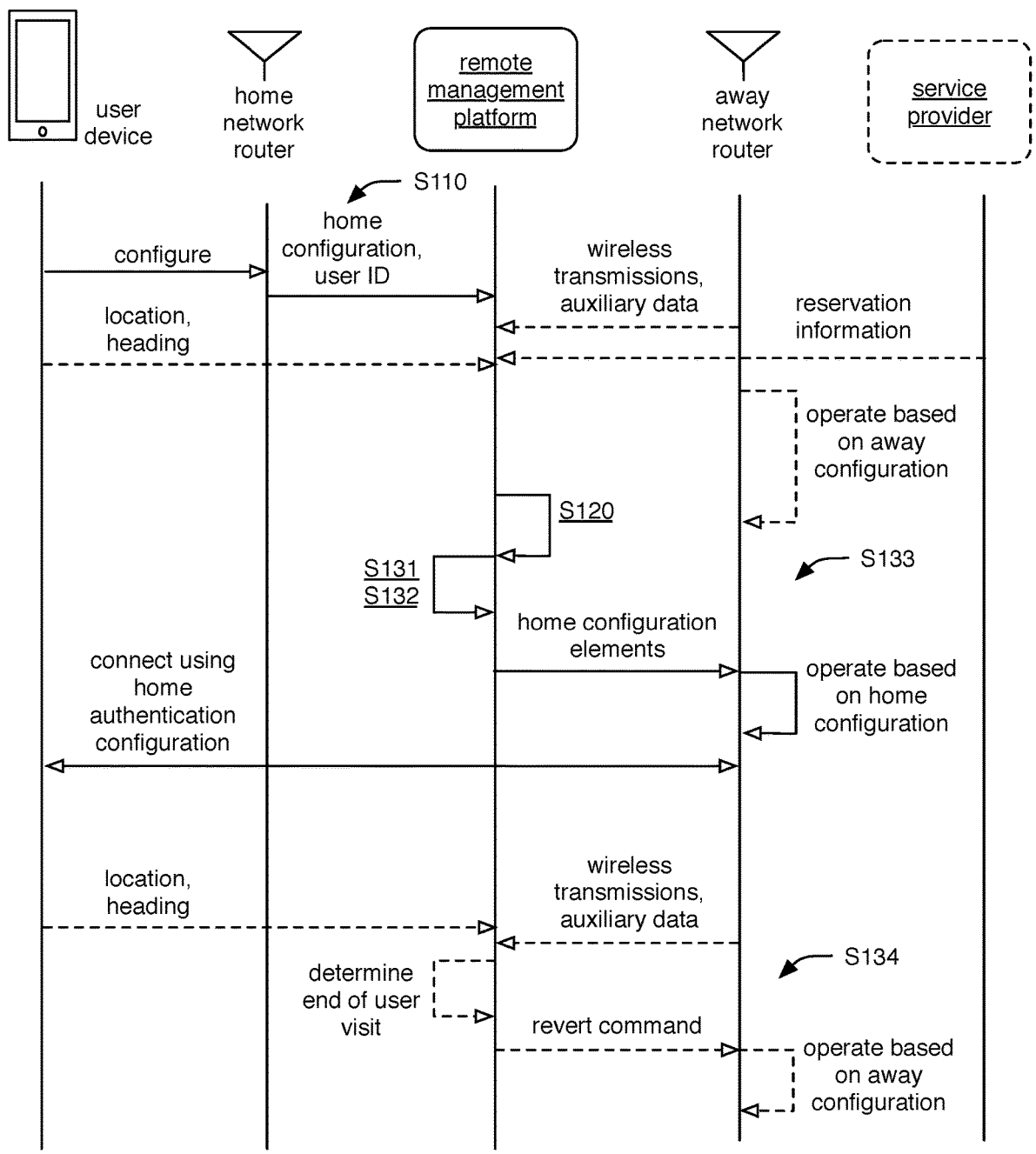
FIG. 8 is a schematic representation of an example of the method.

Configuring the away network smart router to provide a similar experience to a connected user as the home network can additionally or alternatively include facilitating a private connection between one or more guest devices and a device outside the away network (e.g., a device of the home network, the remote management platform, an independent remote server, etc.). One embodiment of facilitating a private connection includes creating a VPN tunnel between the guest VLAN and the home network (example shown in FIG. 7). In a first variation of this embodiment, a home network smart router is already configured to allow the creation of the VPN tunnel. A second variation of this embodiment includes configuring both the away network smart router and a home network smart router to allow the creation of the VPN tunnel. A first example of this variation includes requesting permission (e.g., from a home network administrator, from the user, etc.) to configure the home network smart router and, in response to receiving permission, performing the configuration. A second example includes configuring the home network smart router in response to receiving a request (e.g., from the user, from the home network administrator, etc.) to create the VPN tunnel. The VPN tunnel can be used, for example, to extend access to home network devices (e.g., network-attached storage (NAS), Digital Living Network Alliance (DLNA) server, etc.).

Configuring the away network smart router to provide a similar experience to a connected user as the home network can additionally or alternatively include enabling devices connected to the away network (e.g., host devices) to present information (e.g., authentication credentials, such as passwords and associated usernames) associated with the home network authentication service configuration. For example, a network-connected music system of the away network could authenticate with an internet music service using music service authentication credentials obtained using the home network authentication service configuration.

Permission to perform S133 can be required, requested, and/or received from the user, an away network administrator, home network administrator, service provider (e.g., vendor associated with the away network, ridesharing or homesharing platform, etc.), an electronic device associated with (e.g., connected to, historically used with, etc.) the home and/or away network, and/or any other suitable approver. A permission request can be sent (e.g., by the remote management platform, by a smart router, by a user device, etc.) in response to receiving a permission request selection (e.g., from the user, from a home or away network administrator, etc.), automatically (e.g., in response to S120, before a predicted start time, upon an away network connection attempt, etc.), and/or with any other suitable timing.

Permission to perform S133 can be granted independently for each guest user and/or each performance of S133, or can alternatively be granted uniformly for all potential modifications of a particular away network (e.g., for any guest, for any authorized guest, etc.), or for all potential modifications of all away networks. In a first variation, permission to allow a particular user to use an away network (e.g., permission to modify the away network based on the user's home network) is requested and/or granted for each user and/or each performance of S133. In a second variation, more general permissions can be granted (e.g., based on an away network administrator's network sharing preferences, such as preferences received by and/or stored at a smart router, router management platform, and/or any other suitable computing system, such as a third party computing system). For example, an away network administrator can grant permission to social network connections (e.g., all their Facebook friends, members of a social network group, etc.), guests invited to a party at the away network location (e.g., restricted to use during a time window, such as the evening of the party), and/or any clients of their commercial services associated with the away network (e.g., Airbnb guests, preferably restricted to use during a time interval associated with their reservation, such as between the check-in and check-out times).

Additionally or alternatively, permission to perform S133 can be conditional upon completion of one or more tasks (e.g., granted automatically in response to task completion). For example, users can be required to perform a security check or watch an advertisement.

In one embodiment, S133 includes (e.g., at the remote management platform) transmitting network configuration information to one or more routers of the away network, optionally along with control instructions (e.g., instructions to modify the away network configuration based on the transmitted information), modification time(s) (e.g., start time, stop time, time interval, etc.), and/or any other suitable information.

In a second embodiment, one or more routers of the away network stores the network configuration information (e.g., elements of the home network configuration), preferably in association with an identifier (e.g., user ID, home network ID, etc.). The away network router(s) can optionally store other network configuration information (e.g., information associated with other users that have used the away network and/or can use the away network in the future). In this embodiment, S133 includes, at the router(s) storing the network configuration information, receiving control instructions (e.g., from the remote management platform) to modify the away network based on the stored information. The control instructions can optionally include timing information (e.g., perform immediately, perform at a specific time or within a threshold time from the specific time, perform in response to detecting a trigger event, revert at a specific time, etc.). The router(s) can modify the away network according to the control instructions with any suitable timing (e.g., according to the timing information, immediately in response to receiving the instructions, at a default time, etc.). In one example, in which an away network router stores configuration information associated with a particular identifier (e.g., user ID such as a user account name, user device ID such as a MAC address, etc.), the control instructions can include the identifier, a preferred start time, and a preferred end time. In response to receiving the control instructions, the router can (e.g., near the preferred start time, such as soon before) perform S133 using the stored information (and can optionally perform S134, such as described below, near the preferred end time).

Some or all elements of S130 (e.g., S133) are preferably performed in response to identifying the away network S120. Elements of S130 can be performed immediately after (e.g., as soon as possible or practical) identifying the away network S120, performed at (or before, such as immediately preceding or preceding by at least a minimum time interval) a time determined in S120 such as a start time (e.g., predicted away network visitation time), performed within a predetermined time window preceding the start time, and/or performed at any other suitable time. In some embodiments, elements of S130 are performed repeatedly (e.g., for the same or different users, home networks, away networks, network visits, etc.), such as periodically or sporadically. In one example, the remote management platform periodically identifies away networks, determines appropriate times to modify the away networks, and then controls routers of the away networks (e.g., at or near the determined times) to modify the away network configurations. However, S133 and/or some or all other elements of S130 can additionally or alternatively be performed with any suitable timing.

S130 can optionally include reverting network configuration modifications S134, which functions to return the away network to its original state (e.g., thereby no longer allowing connection to the away network based on the home network authentication configuration). Although reverting network configuration modifications S134 preferably restores the away network configuration to its original state (e.g., its state before performance of S133), S134 is understood to encompass any suitable network configuration modifications following the performance of S133.

S134 can be performed in response to determining that the network configuration modifications are no longer useful (e.g., based on absence of the user from a location associated with the away network, after a predicted time at which the user is expected to leave the location, etc.) and/or no longer authorized (e.g., end of an authorized use time interval, such as an interval associated with a reservation; in response to receiving a de-authorization selection from an administrator of the away network; etc.). For example, S134 can be performed in response to determination that transmissions (e.g., frames) have not been received from the guest device for a predetermined time duration at any of the routers associated with (e.g., cooperatively generating) the away network. In another example, S134 can be performed in response to satisfaction of an end time (e.g., determined in S120), which can result in guest user device disconnection from the away network and/or disallowing future connection to the away network based on the home network authentication configuration. However, S134 can additionally or alternatively be performed at any other suitable time.

After performing S133, the away network routers can optionally retain (e.g., continue to store) the original away network configuration (e.g., configuration before S133). S134 can include reverting to a stored (e.g., original) configuration; receiving network configuration information including the original configuration, such as from the remote management platform, and modifying the away network accordingly; and/or modifying the away network configuration in any other suitable manner. After performing S134, the away network routers can optionally disallow guest device connection to the away network; retain (e.g., continue to store) the modified network configuration and/or associated information (e.g., the configuration elements modified in S133), preferably in association with a home network identifier (e.g., user ID, network ID, etc.); delete the home network configuration information and/or any other suitable information (e.g., information no longer needed by the routers after network configuration reversion); or otherwise manage the modified network configuration (e.g., guest network configuration).

Modifying the away network configuration S130 is preferably performed cooperatively by the remote management platform and the away network smart router. Additionally or alternatively, network modifications can be performed by a smart router alone, by the remote management platform alone, by a user device, and/or by any other suitable system or combination of systems.

Modifying the away network configuration S130 preferably includes preventing away network administrators from discovering secret information about the home network (e.g., private authentication information such as a pre-shared key). A first variation, in which secret information is sent to the away network smart router, can include segregating the secret information to prevent its discovery. For example, the secret information can be encrypted using a key that is not known to the away network administrators, and/or the secret information can be excluded from an away network administration interface that displays home network information. Additionally or alternatively, in this variation, S134 can include deleting the secret information. In a second variation, the secret information is not sent to the away network smart router. For example, authentication with guest devices can be performed (in part or in whole) by the remote management platform, rather than the away network smart router, in order to avoid sending a home network pre-shared key to the away network smart router. However, any suitable measures to prevent discovery of secret information can be taken, or alternatively, no such measures can be taken.

3.4 Determining Information Associated with the Away Network

Determining information associated with the away network S140 can function to determine information of potential interest to entities associated with the away network, can enable improvement of the away network function, and/or can have any other suitable function(s). The information can be determined by the remote management platform; away network routers; user devices; other computing systems (e.g., remote computing systems associated with other entities, such as service providers associated with the away network location and/or social network services); people such as users, administrators, and/or service provider personnel; and/or any other suitable systems. The information can be determined continuously, periodically, sporadically, once, in response to trigger events, and/or with any other suitable timing.

Information determined in S140 can include, for example, information associated with: away network visits, away network usage, devices connected to the away network (e.g., host devices, guest devices, etc.), away network locations, users and/or administrators associated with the away network (e.g., current and/or historical users of the away network, users predicted to visit the away network, etc.), and/or service providers associated with the away network. Visit information can include, for example, predicted visits (and/or predicted visit times) and/or detected visits (e.g., detected based on user location, user device connection to the away network, etc.). Usage information can include bandwidth and/or data transmission usage (and/or times of use), network traffic content (e.g., protocols used, web pages viewed, transmission endpoints, keywords, etc.), and/or any other suitable usage information. Information associated with devices connected to the away network can include a device type, quantity, status (e.g., battery state of charge, appliance failure, door lock position, internet connection quality, etc.), associated user and/or user group (e.g., user family, group associated with a single home network, etc.), device location (e.g., determined based on device location sensors; determined based on properties of wireless communications with the device, such as based on device distance and/or direction relative to one or more away network routers and/or based on radar data such as wireless communication channel state information; etc.), and/or any other suitable information. User and/or administrator information can include location and/or behavior information (e.g., determined based on user device location; determined based on information sampled by auxiliary sensors such as cameras, proximity sensors, motion sensors, power sensors, smoke detectors, and/or microphones; etc.), identity and/or demographic information (e.g., determined based on user account information, network traffic, auxiliary sensors, information received from one or more social network services, parity and/or disparity between such information received from different accounts associated with the user, etc.), evaluation information (e.g., host and/or user score associated with a service), and/or any other suitable information. However, S140 can additionally or alternatively include determining any other suitable information.

In one embodiment, the information determined in S140 (e.g., information associated with guest user behavior) is analyzed in light of location and/or service use policies (e.g., for an away network associated with rental accommodations such as an Airbnb™ listing), such as occupancy maximums, guest type restrictions (e.g., no children, no pets, etc.), behavior rules (e.g., no smoking, maintain quiet conditions at night, do not damage location property, no loud parties, etc.), temporal and/or spatial restrictions (e.g., check-in and/or check-out time, off-limits areas, etc.), and/or any other suitable policies.

A first variation of this embodiment includes determining the number of guests at the location, such as based on the guest devices connected to the away network and/or present at or reporting the location (e.g., based on the number of devices; based on the number of a type of devices, such as presence of 4 laptop computers indicating the likely presence of at least 4 users; based on user associations with the devices, such as presence of devices associated with both a first and second user account indicating the likely presence of at least one user associated with each account; based on device status, such as 5 devices being used concurrently indicating the likely presence of at least 5 users; etc.) and/or based on auxiliary sensor information (e.g., analysis of information, such as images sampled by security cameras and/or audio sampled by microphones, indicative of guest presence at the location).

A second variation includes determining the type(s) of guests at the away network location, such as based on network communications and/or auxiliary sensor information. In one example, based on network traffic including children's television programming, S140 includes predicting the presence of one or more children. In a second example, S140 includes detecting a dog at the location based on analysis of video and/or audio data sampled by auxiliary sensors.

A third variation includes determining a user's position (e.g., specific position within the away network location) and analyzing it in light of the spatial and/or temporal restrictions. User position can be determined based on user device position (e.g., wherein the device position is determined by the device; by the routers, such as using a trilateration technique; etc.), auxiliary sensor information (e.g., audio and/or video data, electrical power data localized to specific outlets and/or circuits, etc.), and/or any other suitable information. In a first example, S140 includes detecting user presence at (and/or near) the location outside of the reservation time interval (e.g., before check-in, after check-out), which can indicate user violation of temporal restrictions. In a second example, S140 includes determining location data indicative of user presence in an off-limits area (e.g., unrented room, private basement, unsafe roof, etc.).

A fourth variation includes determining user behavior. In one example, auxiliary sensor information is indicative of use of the physical location and/or its amenities. In specific examples, video and/or audio data can be indicative of a large party, or excessive electrical power consumption can be indicative of inappropriate appliance usage. In a second example, network communication information is indicative of use of the away network (e.g., of its internet connection), such as indicative of inappropriate and/or undesired behavior (e.g., file sharing of copyrighted material, accessing illegal content, etc.).

In a second embodiment, S140 includes determining (and/or assessing) behavior of entities associated with the away network (e.g., network administrator, location owner and/or manager, service provider, etc.). For example, S130 can include determining whether service provider personnel are appropriately responsive to potential issues (e.g., guest complaints and/or requests, equipment malfunctions, etc.), and/or whether the personnel are inappropriately intrusive (e.g., present at and/or near the property when their presence is not needed or desired). Analogous to possible modifications of user assessments, determinations regarding service provider-related behavior (e.g., behavior of personnel, location owners and/or managers, etc.) can be used to determine and/or modify associated assessments.

In a third embodiment, S140 includes determining potential problems associated with the away network and/or its location, such as appliance failures, internet outages (e.g., determined by the remote management platform based on loss of connection to the away network routers), security issues (e.g., door lock failure, ground floor window left open, etc.), potential emergency conditions (e.g., alarm state of a fire detector, CO detect, intrusion detector, etc.), and/or any other suitable problems. This embodiment preferably includes providing a notification in response determination of such problems (e.g., enabling the notified entity to take corrective action).

S140 optionally includes performing actions based on the determined information. In some variations, S140 includes providing a notification based on the determined information (e.g., notification indicative of the information, notification provided in response to determining the information, etc.), which can function to inform interested parties of the information. The notification is preferably provided (e.g., transmitted) by the remote management platform, but can additionally or alternatively be provided by a smart router, user device, connected appliance (e.g., alarm system), and/or any other suitable entity. The notification is preferably provided to one or more entities associated with the away network (e.g., an away network administrator, away network smart router, away network host device, guest user and/or user device, service provider associated with the away network, security and/or emergency personnel associated with the away network location, etc.), but can additionally or alternatively be provided to any other suitable entities. The notification can be sent (e.g., by email, SMS, push notification, postal mail, etc.), made available (e.g., in a remote database), and/or provided in any other suitable manner.

In one example, S140 includes providing a notification of away network visitation. The notification can be provided in response to user connection to, disconnection from, and/or proximity to the away network. The notification can additionally or alternatively be provided in response to receipt of a request associated with the away network (e.g., connection request, modification settings change request, etc.), and can include an option for the request recipient to allow and/or deny the request. A notification can be provided for each visitation event (e.g., provided in near-real time), and/or batch notifications for a time period or threshold number of visitation events can be provided.

Actions can optionally be performed (e.g., by the remote management platform) in response to determining compliance and/or non-compliance with the policies (e.g., provide notification of non-compliance, determine and/or update user score, modify network and/or appliance configuration, etc.). For example, in response to determining that a user has violated a use policy, the remote management platform can: send a notification to a location owner or manager informing them of the violation; send a notification to a service provider platform, enabling the service provider to modify the user's assessment, such as a score (e.g., reduce the score in response to rule violations and/or inconsiderate behavior, increase the score in response to rule-abiding and/or helpful behavior, etc.); modify or rescind the user's ability to use the away network and/or control network-connected appliances (e.g., perform S134, reduce music volume, lock doors to restricted areas, etc.); activate an alarm system; and/or take any other suitable action(s). In specific examples (e.g., in which the away network is associated with a rental accommodation location), an early arrival notification can be provided in response to determining that a guest has arrived at the location before the reservation starts, a late departure notification can be provided in response to determining that a guest has remained at the location after the reservation ends, an over capacity notification can be provided in response to determining that more guests than permitted by the rental agreement are present at the location, and/or any other suitable policy violation notifications can be provided.

However, S140 can additionally or alternatively include determining any other suitable information associated with the away network, and/or can include any other suitable elements performed in any suitable manner.

3.5 Modifying Network-Connected Device Operation

Modifying operation of network-connected devices S150 functions to modify device operation for the user. The devices (e.g., network-connected appliances) are preferably associated with the away network (e.g., located near the away network, connected to the away network). For example, the devices and away network can all be associated with a temporary accommodation (e.g., hotel room, rental car, ridesharing vehicle, etc.) that the user has rented.

A device's operation (and/or smart router operation pertaining to the device) can be modified to allow the user to control the device. In a first example, after modification, the user can control actuation of a network-connected lock through user device proximity to the lock and/or through computerized requests (e.g., sent using the network, sent to the away network router and/or the remote management platform, etc.) and the user can use a computer interface to set a keycode for lock actuation. In a second example, after modification, the user can control a music system through a user device client. Additionally or alternatively, a device's operation can be modified based on the user (e.g., based on user preferences, historical user behavior, user devices connected to the away network, home network appliance configuration settings, etc.). For example, room lighting characteristics (e.g., intensity, color, etc.) can be adjusted to match the user's typical home lighting usage, and an automatic coffee maker can be scheduled to brew coffee at the user's preferred waking time. Additionally or alternatively, a device's operation can be modified in a similar manner for any user. For example, an alarm system can be deactivated during a user's scheduled stay in a rental home and reactivated at the end of the scheduled stay.

In one implementation of device operation modification, in which the away network is segmented into guest and host VLANs, several appliances in the host VLAN will accept control instructions from any other devices that are able to communicate with them (e.g., devices in the host VLAN, but not by devices in the guest VLAN). In this implementation, the smart router can selectively pass through communications between some or all guest devices (e.g., devices authorized to control the appliances, such as user devices associated with adults) and host appliances the guest is allowed to control (e.g., types of appliances such as lighting systems, appliances located in a guest area of the away network location, etc.), while preventing other network traffic between the guest and host VLANs. In a second implementation, in which device operation control is permitted based on a user device list (e.g., MAC address whitelist), the guest devices can be added to the list of authorized controllers. In a third implementation, in which device operation can be controlled by the remote management platform, device control instructions are passed from the user to the device via the remote management platform (e.g., via a user device client associated with the remote management platform).

The network-connected devices can include security devices (e.g., door lock, security alarm system), computer accessories (e.g., printer, scanner), entertainment systems (e.g., music system, home theater), home appliances (e.g., refrigerator, washing machine, immersion circulator), lights, and/or any other suitable devices. The devices can connected to any suitable network, and their operation can be modified in any suitable manner. Operation of the devices is preferably modified at substantially the same time as the performance of S133, and the modifications can be reverted at substantially the same time as the performance of S134. However, device operation can be modified at any suitable time or times.

3.6 Examples

In a first embodiment, the method 100 includes modifying the away network configuration in response to detecting a user device attempt to discover and/or connect to a network (e.g., away network, home network, etc.), such as an attempt by a user device associated with a user account stored by the remote management platform. The remote management platform can store data associated with the user account, such as user device identifier (e.g., MAC address) and/or elements of the home network configuration (e.g., SSID, PSK, etc.). Detecting a user device network discovery attempt can include, for example, receiving (e.g., at an away network router) a probe request (e.g., including the home SSID and the user device MAC address) and determining that the probe request is from a device associated with the user account. In response to this determination, the away network router can allow the user device to associate with it (e.g., join a service set whose SSID is the home network SSID and/or use the home network PSK to perform authentication; join a service set that has a different SSID such as a default away network SSID; use a different PSK, such as a default away network PSK, to perform authentication; etc.). However, such implementations can not be compatible with user devices that implement anonymization and/or anti-tracking techniques (e.g., transmitting null probe requests rather than directed probe requests; using false MAC addresses, such as randomized MAC addresses, for transmissions such as probe requests; etc.). Further, some such implementations (e.g., those in which the away network router is not in a service set whose identifier is the home network SSID and/or which perform authentication using a PSK other than the home network PSK) can require user intervention (e.g., entering the away network SSID and/or PSK into the user device) before the user device can associate with the away network router.

In a second embodiment, the method 100 includes modifying the away network configuration prior to detecting a user device attempt to discover and/or connect to the away network. For example, the method can include predicting that the user can connect to the away network (e.g., as described above regarding S120) and, in response to the prediction, proactively modifying the away network configuration to allow such connection (e.g., as described above regarding S130), preferably including allowing devices associated with the user to connect to the away network using the home network SSID and PSK (e.g., allowing the device(s) to join a service set having the home network SSID and authenticate using the home network PSK, wherein the service set includes one or more away network routers). This example preferably includes configuring the away network router(s) to broadcast the availability of the service set having the home network SSID (e.g., transmit beacon frames that include the home network SSID), more preferably beginning to do so before detecting any attempts, by devices associated with the user, to discover and/or connect to the away network (e.g., at the away network router(s), beginning to transmit the beacon frames before receiving a probe request from any such devices).

In some examples, the method 100 includes predicting that the user can connect to the away network (e.g., as described above regarding S130) and, in response to the prediction (e.g., immediately, at a future time such as a time associated with the prediction, etc.; such as described above regarding S130), modifying the away network configuration such that one or more away network routers advertise the possibility of connection to the away network using the home network authentication configuration (e.g., transmit beacon frames and/or probe response frames including the home network SSID), but such that the away network routers do not actually allow connection using the home network authentication configuration (e.g., ignoring authentication and/or association requests that use the home network SSID). After performing this initial modification, the method 100 can include additional performance of S120 associated with the user (e.g., refining the prediction, such as based on additional information received after the initial modification) further indicative of potential user connection to the away network. Such additional information can include location information indicative of user presence at or near the away network location, receipt of wireless transmissions indicative of attempts to connect to the away network (e.g., transmissions including the home network SSID and/or user device MAC, such as probe requests, authentication requests, and/or association requests, etc.), and/or any other suitable information. In response to determining such further indications of potential user connection to the away network, the method 100 can include performing another modification of the away network configuration to allow connection using the home network authentication configuration. This staggered modification approach can potentially increase away network router performance by reducing computational and/or radio demands on the routers. For example, this approach can reduce the number of service sets in which the router concurrently acts as an access point (e.g., reducing the time for which the router allows connection to one or more of the service sets, not allowing connection based on erroneous predictions, etc.) and/or increase the number of users able to easily discover and/or connect to the away network (e.g., by reducing a threshold for predicting potential user connection to the away network, thereby performing the initial modification for more home networks).

Figure 9:
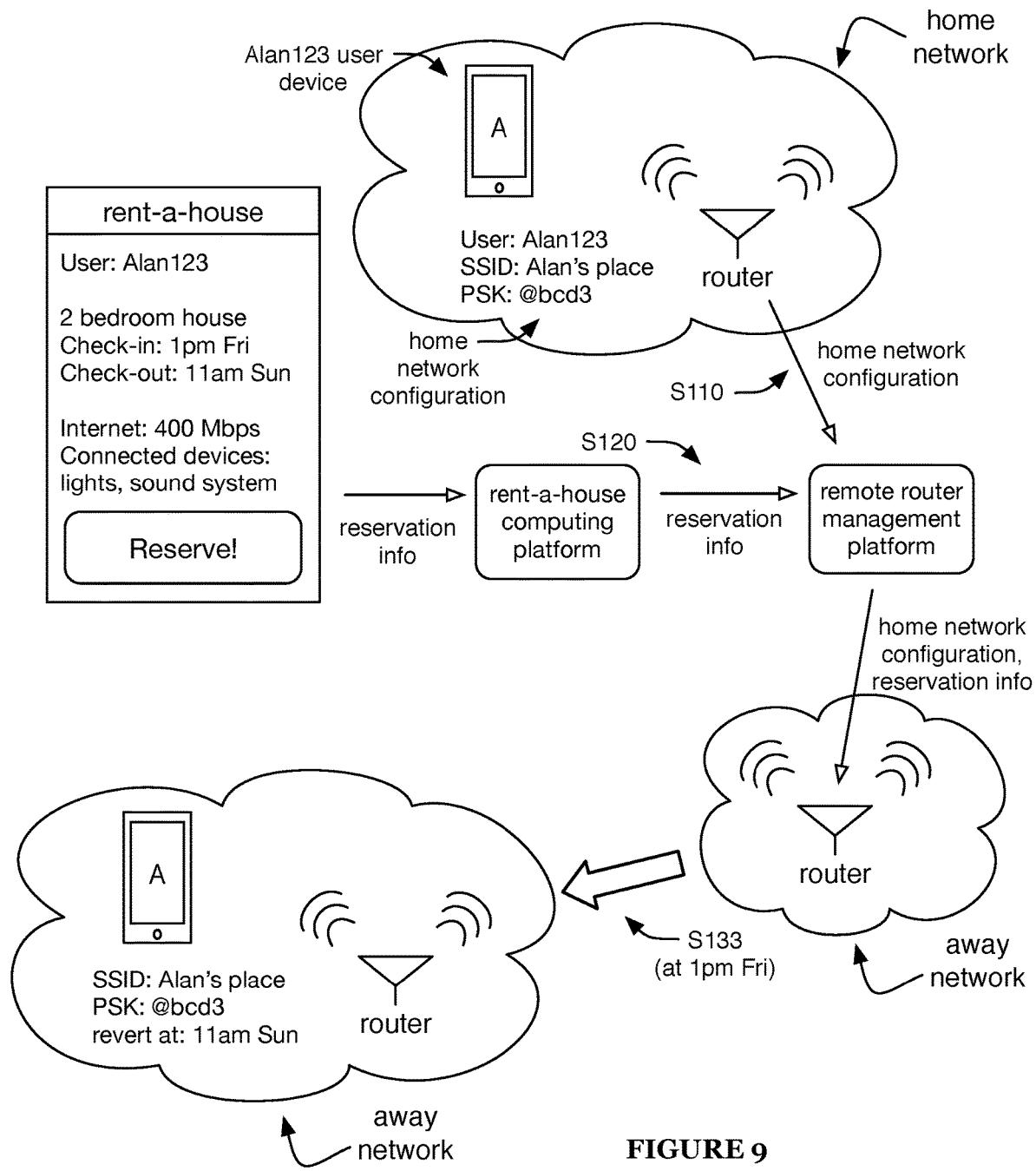
FIG. 9 is a schematic representation of a first specific example of the method.

In one specific example, the away network is associated with a hospitality service provider location (e.g., hotel or hotel room, Airbnb™ rental location, etc.), such as shown in FIG. 9. Informational listings about the location (e.g., rental listings, advertisements, etc.) can include information about the away network (e.g., internet connection information such as bandwidth and/or latency, connected devices such as network-connected appliances controllable by a guest, etc.), preferably information received (e.g., by a computing system of the service provider) from the remote management platform but additionally or alternatively information provided by a person associated with the away network or location (e.g., user, administrator, owner, manager, etc.). In response to generating and/or receiving reservations for the location (e.g., Airbnb™ rental reservations), information indicative of the reservation (e.g., location and/or away network identifier, time interval, guest identifier, etc.) is sent (e.g., from the service provider) to the remote management platform. The reservation information can be sent immediately, periodically (e.g., in batches, such as nightly batches), preceding the reservation start time (e.g., preceding by a threshold amount), and/or at any other suitable time. In response to receiving the reservation information, the remote management platform modifies the away network configuration for the guest (e.g., as described above regarding S130), preferably before the reservation start time (e.g., immediately before, before by a threshold time interval such as 5 minutes or 1 hour, etc.) but alternatively at any other suitable time. A notification can optionally be provided (e.g., from the remote management platform, the service provider, etc.) to the guest (e.g., to a user device associated with the guest), such as a notification indicating that they can connect to the away network. The notification is preferably provided at or near the reservation start time, but can additionally or alternatively be provided at any other suitable time. Optionally, the user can be permitted to control network-connected appliances of the away network (e.g., using the user device connected to the away network, etc.). For example, during the time interval, the user can submit an entry request, and in response to receiving the request, the remote management platform and/or away network router(s) can control a network-connected door lock to unlock. At, near, or after the reservation end time, the remote management platform preferably reverts the network configuration modifications (e.g., as described above regarding S134).

In a second specific example, a user is an administrator of an away network and is associated with a social network account. The user can grant permission for away network access to some or all of their social network connections (e.g., Facebook friends, from one or more social networking systems, etc.) as guest users, and can optionally grant permission for some or all such guest users to modify operation of some or all network-connected appliances of the away network. The social network connections' device (and/or home network) information can be received from the social networking system, determined based on the network identifier or user account associated with the social network connection, or otherwise determined. Based on the permissions granted, the method 100 can include determining that a guest user will connect to the away network (e.g., as described above regarding S120), modifying away network configuration based on that guest user's home network configuration (e.g., as described above regarding S130), and/or performing any other suitable elements of the method 100 (e.g., as described above). In one example, the method includes: receiving a connection request from the guest user device at the local router or remote computing system (e.g., social networking system's remote computing system, remote management platform, etc.); verifying the guest user device (or associated identifier) with the permissions list (e.g., stored at the remote computing system, at the social networking system, etc.); denying access if the guest user device is not included in the permissions list (or included in a blacklist); and initiating S130 if the guest user device is included in the permissions list. However, the away network administrator's social network can be otherwise leveraged in performing the method.

Figure 10:
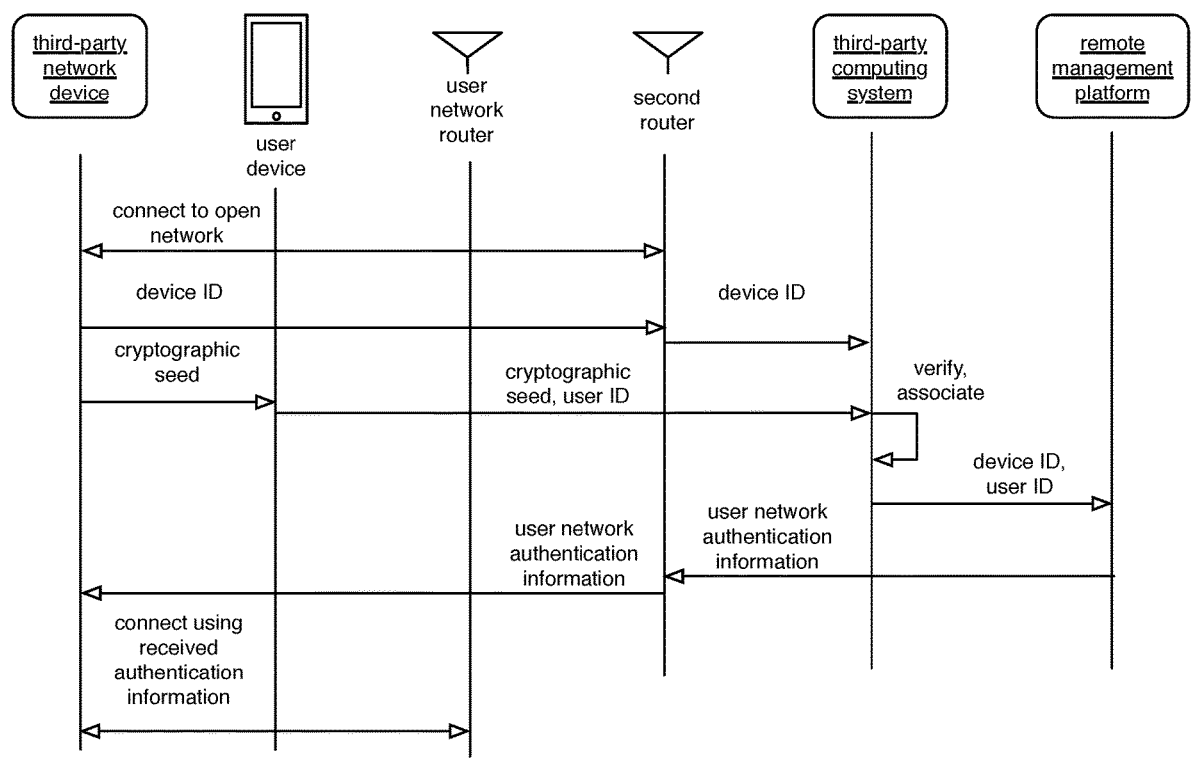
FIG. 10 is a schematic representation of a second specific example of the method.

In a third specific example, a third-party network device (e.g., associated with a social network service) connects to a user's network using the following technique, such as shown in FIG. 10. An internet-connected user device (e.g., client running on the user device, such as a social network client) associated with the network (e.g., connected to the network, associated with the user, etc.) receives a cryptographic seed from the third-party network device (e.g., via wireless communication such as Bluetooth; via an optical identifier such as a barcode, QR code, or text identifier; etc.). The user device transmits the cryptographic seed and a user identifier (e.g., associated with a user account of the social network service) to a third-party computing system (e.g., social network platform). The third-party device connects to an open network (e.g., network that does not require an authentication credential, such as a hidden restricted open Wi-Fi network wherein the access points do not transmit beacon frames including the SSID and client devices connected to the network are restricted to only access specific endpoints via the internet), such as an open network hosted by a smart router (e.g., of the user's network, another network, etc.), and transmits information associated with itself (e.g., device identifier) to the third-party computing system (e.g., via the open network). In response to receiving the information from both the user device and third-party device, the third-party computing system verifies the cryptographic seed, associates the third-party device with the user's account, and transmits information indicative of the association to the router remote management platform. In response to receiving the information, the remote management platform transmits a command to the smart router, instructing it to provide the user's network authentication information to the third-party device (e.g., wherein the command can optionally include the authentication information). The smart router provides the information via the open network, and in response to receiving it, the third-party device connects to the user's network using the information (e.g., after disconnecting from the open network).

However, the method 100 can additionally or alternatively include any other suitable elements, and/or can be performed in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method comprising:
   storing, by a remote server, wireless access point (WAP) configuration data associated with a user account, wherein the WAP configuration data comprises a first service set identifier (SSID) and a pre-shared key (PSK) of a first local area network (LAN) corresponding to a first region, and wherein the WAP configuration data further comprises appliance control data associated with a device connected to a WAP of a second LAN using a second SSID and a second PSK, the WAP and the device being at a second region that is different than the first region, wherein the first SSID and the PSK are unknown to the device;
   determining, by the remote server, that a user device is located within the second region associated with the second LAN;
   automatically configuring, by the remote server, the WAP using the WAP configuration data, wherein automatically configuring the WAP comprises:
      configuring the WAP to create a first virtual LAN (VLAN) that allows the user device to connect to the WAP using the first SSID and the PSK and to receive a communication from the user device directed to the device connected to the WAP on the second LAN; and
      configuring the WAP to modify an operation of the device via the second LAN in response to determining that the user device is located within the second region at a first time and in response to the communication from the user device, wherein the operation of the device, when modified by the WAP, allows the user device to control the device.

2. The method of claim 1, wherein determining that the user device is located within the second region comprises:
   receiving location data from the user device; and
   determining from the location data that the user device is located within the second region.

3. The method of claim 1, wherein determining that the user device is located within the second region comprises receiving, by the remote server, an indication that the WAP received a request from the user device to discover or connect to the second LAN, wherein configuring the WAP to allow the user device to connect to the second LAN is further based on a response to determining that the user device is located within the second region.

4. The method of claim 1, further comprising:
   predicting, by the remote server at a second time prior to the first time, that the user device will be present in the second region at the first time; and
   configuring the WAP to broadcast the first SSID during a time interval that includes the first time.

5. The method of claim 4, wherein predicting that the user device will be present in the second region is further based on social graph information associated with the user device.

6. The method of claim 4, further comprising receiving, by the remote server, historical location data associated with the user device, and wherein predicting that the user device will be present in the second region is further based on the historical location data.

7. The method of claim 1, further comprising:
   determining, at a second time, that the user device is no longer present within the second region; and
   configuring the WAP to disconnect the user device from the second LAN.

8. The method of claim 1, wherein the device is at least one of a security device, an entertainment system, a home appliance, or a light bulb.

9. A method comprising:
   storing, by a remote server, wireless access point (WAP) configuration data associated with a user account, wherein the WAP configuration data comprises a first service set identifier (SSID) and a pre-shared key (PSK) of a first local area network (LAN) corresponding to a first region, and wherein the WAP configuration data further comprises appliance control data associated with a device connected to a WAP of a second LAN using a second SSID and a second PSK, the WAP and the device being at a second region that is different than the first region, wherein the first SSID and the PSK are unknown to the device;
   predicting, by the remote server at a second time prior to a first time, that a user device will be present in the second region, associated with the WAP, during a time interval that includes the first time;
   automatically configuring, by the remote server, the WAP using the WAP configuration data, wherein automatically configuring the WAP comprises:
      configuring the WAP to create a first virtual LAN (VLAN) that allows the user device to connect to the WAP using the first SSID and the PSK and to receive a communication from the user device directed to the device connected to the WAP of the second LAN; and
      configuring the WAP to modify an operation of the device via the second LAN in response to determining that the user device is present within the second region at the first time and in response to the communication from the user device, wherein the operation of the device, when modified by the WAP, allows the user device to control the device.

10. The method of claim 9, further comprising receiving, by the remote server, historical location data associated with the user device, and wherein predicting that the user device will be present in the second region comprises predicting that the user device will be present in the second region using the historical location data.

11. The method of claim 9, further comprising receiving, by the remote server, a reservation for a hospitality service associated with the WAP, wherein the reservation is associated with the user account and the time interval.

12. The method of claim 9, wherein the WAP is associated with a vehicle of a transportation network, and wherein predicting that the user device will be present in the second region comprises receiving information associated with a service request of the transportation network, and wherein the information is associated with the user account, the time interval, and the vehicle.

13. The method of claim 9, wherein predicting that the user device will be present in the second region during the time interval comprises predicting that the user device will be present in the second region during the time interval using a set of social graph information associated with the user device.

14. The method of claim 9, further comprising receiving, by the remote server, historical location data associated with the user device, and wherein predicting that the user device will be present in the second region during the time interval comprises predicting that the user device will be present in the second region during the time interval using the historical location data.

15. The method of claim 9, further comprising:
determining at a third time after the first time that the user device is no longer present in the second region; and
in response to determining that the user device is no longer present in the second region, configuring the WAP to disallow connection of the user device to the LAN using the first SSID and the PSK.

16. The method of claim 9, wherein the device is at least one of a security device, an entertainment system, a home appliance, or a light bulb.

\* \* \* \* \*